United States Patent
Grosso

(10) Patent No.: US 8,924,241 B2
(45) Date of Patent: Dec. 30, 2014

(54) SYSTEM AND METHOD TO DETERMINE AN INSURANCE POLICY BENEFIT ASSOCIATED WITH AN ASSET

(71) Applicant: Anthony J. Grosso, Suffield, CT (US)

(72) Inventor: Anthony J. Grosso, Suffield, CT (US)

(73) Assignee: Hartford Fire Insurance Company, Hartford, CO (US)

( * ) Notice: Subject to any disclaimer, the term of this patent is extended or adjusted under 35 U.S.C. 154(b) by 0 days.

(21) Appl. No.: 13/786,833

(22) Filed: Mar. 6, 2013

(65) Prior Publication Data

US 2014/0142989 A1    May 22, 2014

Related U.S. Application Data

(60) Provisional application No. 61/727,848, filed on Nov. 19, 2012.

(51) Int. Cl.
*G06Q 40/00* (2012.01)
*G06Q 40/08* (2012.01)
*G06Q 10/00* (2012.01)
*G06Q 99/00* (2006.01)
*G06F 7/00* (2006.01)

(52) U.S. Cl.
CPC .......... *G06Q 40/08* (2013.01); *G06Q 10/00* (2013.01); *G06Q 99/00* (2013.01); *G06F 7/00* (2013.01); *G06Q 40/00* (2013.01)
USPC .................................................. 705/4

(58) Field of Classification Search
CPC ....... G06Q 40/00; G06Q 40/08; G06Q 17/30; G06Q 99/00; G06Q 10/00; G06F 7/00
USPC .................................................. 705/4
See application file for complete search history.

(56) References Cited

U.S. PATENT DOCUMENTS

| | | | | |
|---|---|---|---|---|
| 6,829,584 | B2 * | 12/2004 | Loveland | 705/7.11 |
| 7,356,393 | B1 * | 4/2008 | Schlatre et al. | 701/29.3 |
| 2006/0259184 | A1 * | 11/2006 | Hayes et al. | 700/221 |
| 2009/0005927 | A1 * | 1/2009 | Schlatre et al. | 701/30 |
| 2009/0043629 | A1 * | 2/2009 | Price | 705/8 |

(Continued)

OTHER PUBLICATIONS

Zellermayer, O. (1996). The pain of paying. (Order No. 9713193, Carnegie Mellon University). ProQuest Dissertations and Theses, 133-133 p. Retrieved from http://search.proquest.com/docview/304238079?accountid=14753. (304238079).*

Solano-Cayama, R. (2008). Service supply chain management: A hierarchical decision modeling approach. (Order No. 3443057, New Jersey Institute of Technology). ProQuest Dissertations and Theses, , 192-n/a. Retrieved from http://search.prequest.com/docview/855746805?accountid=14753. (855746805).*

*Primary Examiner* — Muriel Tinkler
(74) *Attorney, Agent, or Firm* — Buckley, Maschoff & Talwalkar LLC

(57) ABSTRACT

A system and method are disclosed herein to determine an insurance benefit associated with an insurance policy for an asset, such as an automobile or a residence. The system includes a computer memory and a processor in communication with the computer memory. The computer memory may store data indicative of (i) a recommended maintenance schedule for the asset and (ii) at least one actual maintenance event that has occurred in connection with the asset. The processor may compare the at least one actual maintenance event with the recommended maintenance schedule and determine the benefit for the insurance policy based at least in part on a result of said comparing. The processor may then transmit an indication of the benefit for the insurance policy.

27 Claims, 20 Drawing Sheets

(56) References Cited

U.S. PATENT DOCUMENTS

| | | |
|---|---|---|
| 2011/0153372 A1 * | 6/2011 | Weinstock et al. ............... 705/4 |
| 2011/0196571 A1 | 8/2011 | Foladare et al. |
| 2012/0072243 A1 | 3/2012 | Collins et al. |
| 2012/0072244 A1 | 3/2012 | Collins et al. |
| 2012/0109692 A1 * | 5/2012 | Collins et al. ..................... 705/4 |

* cited by examiner

| OWNER ID 1902 | POLICY ID 1904 | MAINTENANCE EVENT 1906 | DATE AND TIME 1908 | LOCATION 2010 |
|---|---|---|---|---|
| OWN_101 | P901 | OIL CHANGE | APRIL 4, 2014 12:05 PM | 41.2814° N 73.4986° W |
| OWN_101 | P901 | TIRE ROTATION | JULY 3, 2015 2:22 PM | 20 MAIN STREET, HARTFORD, CT |
| OWN_101 | P901 | BRAKE CHECK | JULY 3, 2015 3:10 PM | 41.2815° N 73.4987° W |
| OWN_101 | P901 | OIL CHANGE | JULY 3, 2015 3:15 PM | STATION_102 |

| ASSET ID 2002 | POLICY ID 2004 | MANUFACTURER 2006 | RECOMMENDED MAINTENANCE 2008 | TRIGGER 2010 |
|---|---|---|---|---|
| A101 | P901 | HEATING SYSTEM: HEATER CORP. | CLEANING | 5,000 HOURS |
| A102 | P901 | FIRE ALARM | BATTERY CHANGE | 4 MONTHS |
| A103 | P901 | GARAGE DOOR OPENER | SAFETY CHECK | YEARLY |
| A101 | P123 | HEATING SYSTEM: JONES INCORPORATED | CLEANING | 2,500 HOURS |

SYSTEM AND METHOD TO DETERMINE AN INSURANCE POLICY BENEFIT ASSOCIATED WITH AN ASSET

CROSS-REFERENCE TO RELATED APPLICATION

The present application claim the benefit of U.S. Provisional Patent Application 61/727,848 filed on Nov. 19, 2012 and entitled "SYSTEM AND METHOD TO DETERMINE AN INSURANCE POLICY BENEFIT ASSOCIATED WITH AN ASSET." The entire contents of that application is incorporated herein by reference.

FIELD OF THE INVENTION

In general, the invention relates to a computerized system and method for determining an insurance policy benefit associated with an asset, such as an automobile or residence.

BACKGROUND OF THE INVENTION

The insurance industry has begun exploring the use of maintenance information as a way of determining an owner's behavior and, from this, risk for the purposes of underwriting, pricing, renewing, and servicing asset insurance. For example, an automobile owner who regularly checks tire inflation may have a reduced likelihood of being involved in an accident. It can be difficult to encourage owners to provide such data and/or to adjust maintenance habits in ways that may lower risk. The relationships between maintenance data (e.g., where and when an asset is serviced) and the real world can be difficult for an owner to understand. For example, a homeowner might not realize that having his or her heating system cleaned after a pre-determined number of hours of use, as recommended by the heating system manufacturer, may greatly reduce the chance of fire damage.

SUMMARY

Therefore, there is a need in the art for ways to encourage owners to provide maintenance information and/or modify behaviors so as to reduce a likelihood of accidents and losses. Such measures may, according to some embodiments, use data indicative of (i) a recommended maintenance schedule for the asset and (ii) at least one actual maintenance event that has occurred in connection with the asset. A processor may compare the at least one actual maintenance event with the recommended maintenance schedule and determine a benefit for an insurance policy based at least in part on a result of said comparing. The processor may then transmit an indication of the benefit for the insurance policy.

According to another aspect, the invention relates to computerized methods for carrying out the functionalities described above. According to another aspect, the invention relates to non-transitory computer readable medium having stored therein instructions for causing a processor to carry out the functionalities described above.

BRIEF DESCRIPTION OF THE DRAWINGS

FIG. 19 is a tabular portion of a maintenance database in accordance with some embodiments.

FIG. 20 is a tabular portion of a manufacturer database in accordance with some embodiments.

DESCRIPTION OF CERTAIN ILLUSTRATIVE EMBODIMENTS

To provide an overall understanding of the invention, certain illustrative embodiments will now be described, including systems and methods for determining an insurance premium discount using maintenance data, manufacturer recommendations, and/or telematics data. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
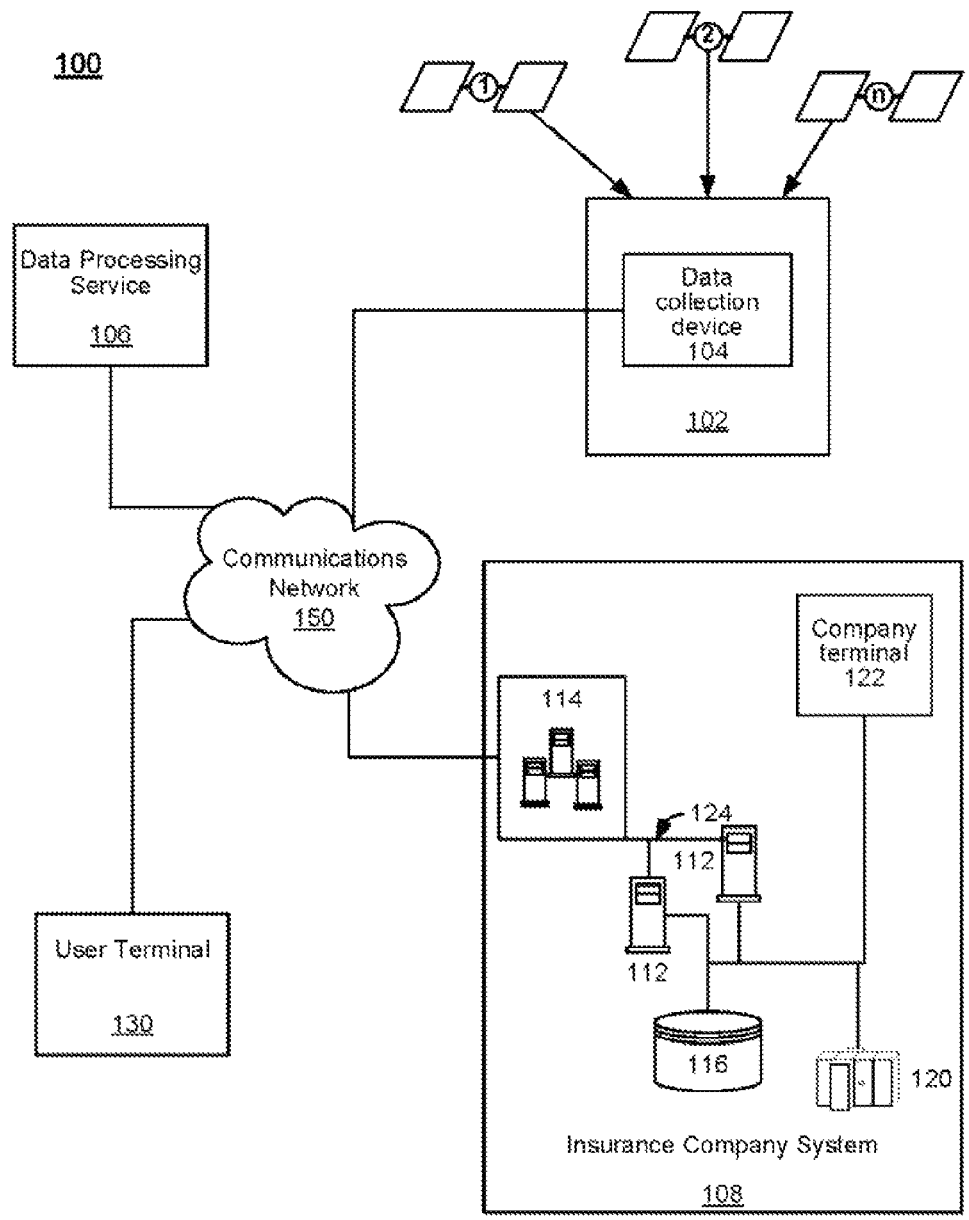
FIG. 1 is an architectural model of a system for determining a discount or other benefit for an insurance policy based on maintenance data, according to an illustrative embodiment of the invention.

FIG. 1 is a block diagram of a system 100 for determining a discount or other benefit for an insurance policy associated with an "asset" based at least in part on maintenance data according to an illustrative embodiment. As used herein, the term "asset" might refer to, for example, a vehicle (e.g., an automobile, snowmobile, motorcycle, or boat) or a residence (e.g., a stand-alone house or apartment). The system 100 may collect maintenance data from an asset owner, service provider, and/or the asset itself. The system 100 may also use data collected along multiple trips traveled by a vehicle, including, for example, speeding information, time of day information, and/or safety event information. An insurance company may use maintenance data, manufacturer recommendations, and/or route data, such as Global Positioning Satellite ("GPS") latitude and longitude data, acceleration/deceleration data, speed data, and/or vehicle orientation data collected along a route traveled by the vehicle to determine risk associated with an asset and/or owner. With a sufficient amount of data, the insurance company can calculate a level of risk score for the owner based on, for example, the owner's maintenance habits. The insurance company can use the score for setting or adjusting a discount value to be applied to an insurance premium. In some implementations, a score or discount is determined by a third party data processing service. In addition, the score or discount may be set by an underwriter, which may be a part of the insurance company or otherwise affiliated with or in a third party arrangement with the insurance company. According to any embodiments described herein, a score might be used to determine a premium price, a premium adjustment, and/or any other benefit that may be associated with an insurance policy (e.g., a decreased deductible value or increased overall coverage amount).

The system 100 includes one or more vehicles 102, each having a data collection device 104. The vehicle 102 may be an automobile, motorcycle, truck, bus, watercraft, aircraft, or any other vehicle operated by a driver. A data collection device 104 is coupled to a vehicle 102 for collecting data about the vehicle's maintenance history, location, movements, and/or other information that can be used to determine risk scores. The data collection device 104 may be positioned inside the vehicle 102, attached to the outside of the vehicle 102, or integrated into the vehicle 102. The data collection device 104 may be in communication with an insurance company system 108 over a communication network 150. The data collection device 104 may communicate with the insurance company system 108 though a wireless network such as a cellular network or using a wireless Internet connection. In general, the data collection device 104 can be any computing device or plurality of computing devices in cooperation having a data collection sensor (e.g., an antenna or an accelerometer), a processor, a memory, and a means for transmitting the collected data. The owner's vehicle 102 or data collection device 104 may include an antenna for receiving signals from Global Navigation Satellite System ("GNSS") satellites, numbered 1 through "n" in FIG. 1. In one implementation, the data collection device 104 is also configured to process the collected data. In some embodiments, the data processing protects the driver's privacy by encrypting the data, removing location information, producing summary information, or taking other measures to reduce the likelihood that location information, speed information, or other sensitive information are received by the insurance company or third parties.

In some embodiments, rather than sending collected data directly to the insurance company system 108, the data collection device 104 sends collected data to a data processing service 106, which processes the data to determine a risk score and/or an appropriate premium discount for a driver that is then sent to the insurance company system 108. This can help protect a driver's privacy, since the insurance company does not get detailed data about a driver's location, but only receives summary information. Using a data processing service 106 is in some implementations also preferable to having the data collection device 104 process data to output a risk score because it reduces the processing power needed by data collection device 104 and because using a third party data processing service 106 may also make it more difficult for drivers to tamper with the data. The data processing service 106 can perform additional monitoring functions, such as vehicle security monitoring or providing location-based alerts (e.g., alerting a parent or employer when a vehicle travels an unusual path) and/or speed alerts. Note that an insurance company might receive detailed reports from the third party data processing service 106, summary reports (with certain details removed), and/or supplemented information (e.g., including information from one or more public databases). According to some embodiments, an owner may provide maintenance data via a user terminal 130 (e.g., the owner might indicate that an oil change has been performed via a web page).

The insurance company system 108 includes a plurality of application servers 112, a plurality of load balancing proxy servers 114, an insurance company database 116, a processing unit 120, and company terminal 122. These computing devices are connected by a local area network 124.

The application servers 112 are responsible for interacting with the data collection device 104 and/or the data processing service 106. The data exchange between the insurance company system 108 and data collection device 104 and/or data processing service 106 can utilize push and pull technologies where the application servers 112 of the insurance company system 108 can act as both a server and client for pushing data to the data processing service 106 (e.g., which vehicles to monitor, when to stop data collection, rules for monitoring services requested by the customer) and for pulling data from the data processing service 106. The application servers 112 or other servers of the insurance company system 108 can request to receive periodic data feeds from the data collection device 104 and/or data processing service 106. The communication between the application servers 112 and the data processing service 106 can follow various known communication protocols, such as TCP/IP. Alternatively, the application servers 112 and data processing service 106 can communicate with each other wirelessly, e.g., via cellular communication, Wi-Fi, Wi-Max, or other wireless communications technologies or combination of wired or wireless channels. The load balancing proxy servers 114 operate to distribute the load among application servers 112.

The insurance company database 116 stores information about vehicular insurance policies. For each insurance policy, the database 116 includes for example and without limitation, the following data fields: policy coverage, a risk rating, policy limits, deductibles, the agent responsible for the sale or renewal, the date of purchase, dates of subsequent renewals, product and price of product sold, applicable automation services (for example, electronic billing, automatic electronic funds transfers, centralized customer service plan selections, etc.), customer information, customer payment history, or derivations thereof. Note that any of the embodiments described herein might be associated with existing insurance policies, newly issued insurance policies, and/or policies that have not yet been issued (e.g., a policy that might be offered to an automobile owner).

The processing unit 120 is configured for determining the price of an insurance premium based on a risk rating for a driver or vehicle. The processing unit 120 may comprise multiple separate processors, such as a risk or safety processor, which may calculates a safety rating from raw or processed data from the data collection device 104 or data processing service 106 over the communications network 150; and a business logic processor, which determines a premium price for a policyholder based on, among other things, a risk score. In some embodiments, insurance premium prices or information for making insurance pricing determinations may be generated by a third-party underwriter, which is separate from the insurance company system 108. An exemplary implementation of a computing device for use in the processing unit 120 is discussed in greater detail in relation to FIG. 2.

The company terminals 122 provide various user interfaces to insurance company employees to interact with the processing system 120. The interfaces include, without limitation, interfaces to review maintenance and/or telematics data, or risk ratings; to retrieve data related to insurance policies; to manually adjust a risk rating; and to manually adjust premium pricing. In some instances, different users may be given different access privileges. For example, marketing employees may only be able to retrieve information on insurance policies but not make any changes to data. Such interfaces may be integrated into one or more websites for managing the insurance company system 108 presented by the application servers 112, or they may be integrated into thin or thick software clients or stand alone software. The company terminals 122 can be any computing devices suitable for carrying out the processes described above, including personal computers, laptop computers, tablet computers, smartphones, servers, and other computing devices.

The user terminal 130 provides various user interfaces to owners to interact with the insurance company system 108 over the communications network 150. Potential customers can use user terminals 130 to retrieve policy and pricing information for insurance policies offered by the insurance company. Customers can enter information pertaining to asset maintenance and/or changes in their insurance policy, e.g., changes in policy coverage, addition or subtraction of drivers, addition or subtraction of vehicles, relocation, mileage information, etc. Customers can also use the user terminal 130 for a pay-as-you-go insurance policy in which customers purchase insurance by the trip or mile.

In some embodiments, the data collection device 104 may not be continually connected to the insurance company system 108 via the network 150. For example, the data collection device 104 may be configured to temporarily store data if the data collection device 104 becomes disconnected from the network, like when it travels out of range of cellular towers. When the connection is restored, the data collection device 104 can then transmit the temporarily stored data to the insurance company system 108. The data collection device 104 may alternatively be configured to connect to the communications network 150 through a user's home Wi-Fi network. In this case, the data collection device 104 stores trip data until it returns to the vicinity of the user's home, connects to the user's wireless network, and sends the data. In some embodiments, the data collection device 104 is not connected to the network 150 at all, but rather, data collected is transmitted to the insurance company through other means. For example, a customer can receive a data collection device 104 from the insurance company, couple the device 104 to his car for a set period of time or number of miles, and then either mail the device 104 with the collected data to the insurance company system 108 or extract and send the collected data to the insurance company system 108 via mail, email, or through a website.

Although the asset described with respect to FIG. 1 is an automobile, note that similar systems may be associated with a residence and/or appliances, etc. that may be located at and/or service the residence (e.g., heating and cooling systems). Moreover, some embodiments might be associated with different types of vehicles, including a boat, a snowmobile, and/or an airplane.

Figure 2:
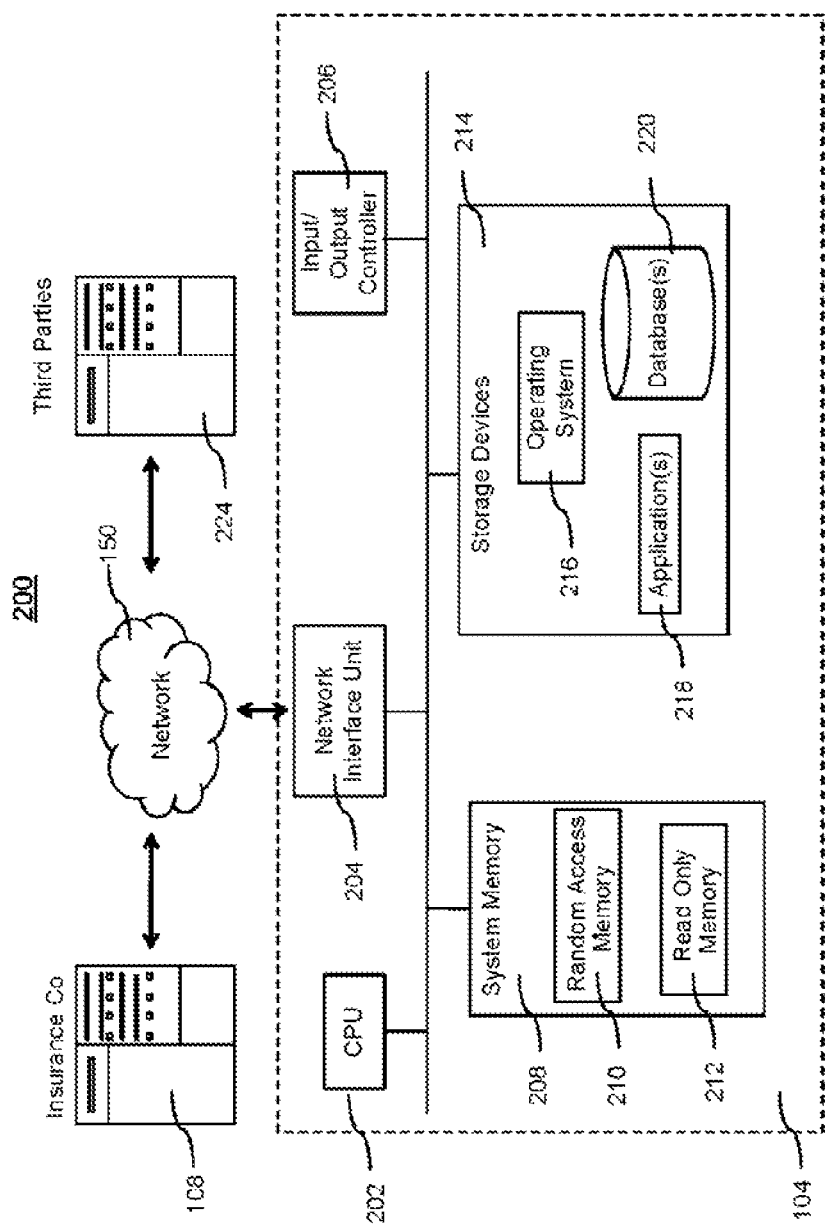
FIG. 2 is a block diagram of a computing system as used in FIG. 1, according to an illustrative embodiment of the invention.

FIG. 2 is a block diagram of a computing device 200 used for carrying out at least one of an insurance premium discount or other benefit determination and business logic processing described in relation to FIG. 1, according to an illustrative embodiment of the invention. The computing device 200 comprises at least one network interface unit 204, an input/output controller 206, system memory 208, and one or more data storage devices 214. The system memory 208 includes at least one Random Access Memory ("RAM") 210 and at least one Read-Only Memory ("ROM") 212. All of these elements are in communication with a Central Processing Unit ("CPU") 202 to facilitate the operation of the computing device 200. The computing device 200 may be configured in many different ways. For example, the computing device 200 may be a conventional standalone computer or alternatively, the functions of computing device 200 may be distributed across multiple computer systems and architectures. The computing device 200 may be configured to perform some or all of the insurance premium discount determination and business logic processing, or these functions may be distributed across multiple computer systems and architectures. In the embodiment shown in FIG. 2, the computing device 200 is linked, via network 150 or local network 124, to other servers or systems housed by the insurance company system 108, such as the load balancing server 114, and/or the application servers 112.

The computing device 200 may be configured in a distributed architecture, wherein databases and processors are housed in separate units or locations. The computing device 200 may also be implemented as a server located either on site near the insurance company system 108, or it may be accessed remotely by the insurance company system 108. Some such units perform primary processing functions and contain at a minimum a general controller or a processor 202 and a system memory 208. In such an embodiment, each of these units is attached via the network interface unit 204 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 202 comprises a processor, such as one or more conventional microprocessors and one or more supplementary co-processors such as math co-processors for offloading workload from the CPU 202. The CPU 202 is in communication with the network interface unit 204 and the input/output controller 206, through which the CPU 202 communicates with other devices such as other servers, user terminals, or devices. The network interface unit 204 and/or the input/output controller 206 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 202 is also in communication with the data storage device 214. The data storage device 214 may comprise an appropriate combination of magnetic, optical and/or semiconductor memory, and may include, for example, RAM, ROM, flash drive, an optical disc such as a compact disc and/or a hard disk or drive. The CPU 202 and the data storage device 214 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, the CPU 202 may be connected to the data storage device 214 via the network interface unit 204.

The CPU 202 may be configured to perform one or more particular processing functions. For example, the computing device 200 may be configured for calculating a risk or safety score for an asset owner. The same computing device 200 or another similar computing device may be configured for calculating an aggregate risk rating based on multiple safety scores. The same computing device 200 or another similar computing device may be configured for calculating an insurance premium discount for a vehicle or driver based at least the risk scores and/or the safety rating.

The data storage device 214 may store, for example, (i) an operating system 216 for the computing device 200; (ii) one or more applications 218 (e.g., computer program code and/or a computer program product) adapted to direct the CPU 202 in accordance with the present invention, and particularly in accordance with the processes described in detail with regard to the CPU 202; and/or (iii) database(s) 220 adapted to store information that may be utilized to store information required by the program. The database(s) 220 may including all or a subset of data stored in insurance company database 116, described above with respect to FIG. 1, as well as additional data, such as formulas or manual adjustments, used in establishing the insurance risk for an asset.

The operating system 216 and/or applications 218 may be stored, for example, in a compressed, an uncompiled and/or an encrypted format, and may include computer program code. The instructions of the program may be read into a main memory of the processor from a computer-readable medium other than the data storage device 214, such as from the ROM 212 or from the RAM 210. While execution of sequences of instructions in the program causes the CPU 202 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for scoring risk based on maintenance data associated with an asset or owner over a period of time. The program also may include program elements such as an operating system, a database management system and "device drivers" that allow the processor to interface with computer peripheral devices (e.g., a video display, a keyboard, a computer mouse, etc.) via the input/output controller 206.

The term "computer-readable medium" as used herein refers to any non-transitory medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include Dynamic Random Access Memory ("DRAM"), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or Electronically Erasable Programmable Read-Only Memory ("EEPROM"), a FLASH-EEPROM, any other memory chip or cartridge, or any other non-transitory medium from which a computer can read.

Various forms of computer readable media may be involved in carrying one or more sequences of one or more instructions to the CPU 202 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 3:
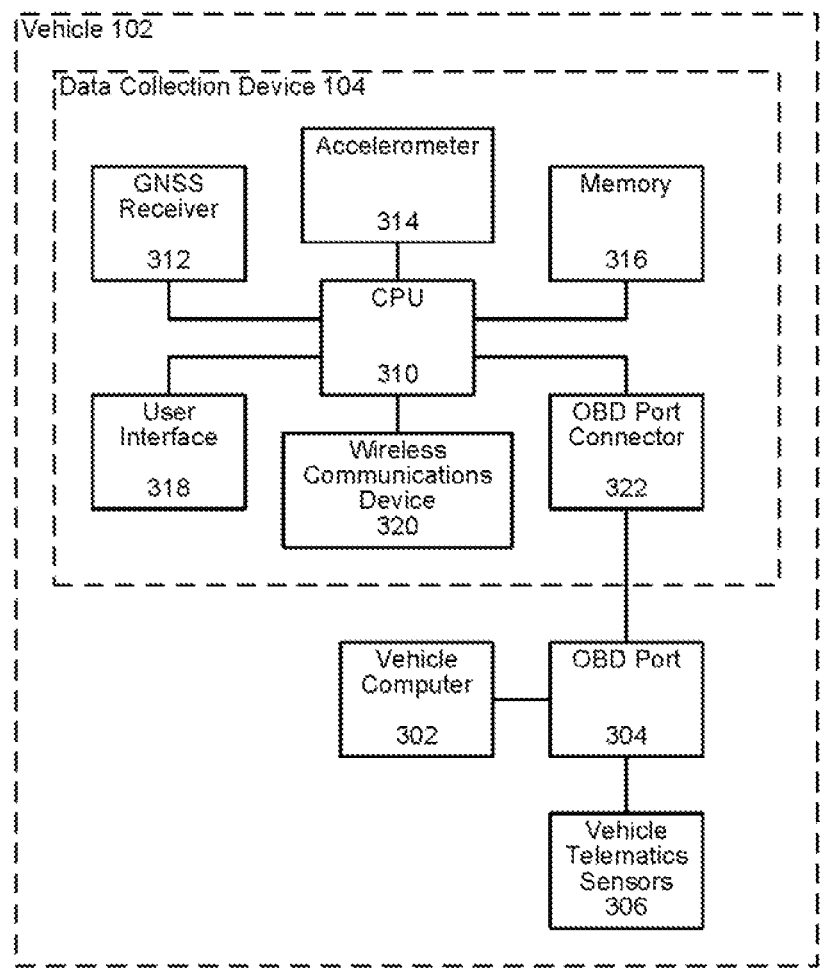
FIG. 3 is a block diagram of a vehicle and a device coupled to the vehicle for collecting telematics data, according to an illustrative embodiment of the invention.

FIG. 3 is a block diagram of a vehicle 102 having a data collection device 104. As described with regard to FIG. 1, the vehicle 102 may be an automobile, motorcycle, truck, bus, watercraft, aircraft, or any other vehicle operated by a driver. The vehicle 102 includes a vehicle computer 302, an On-Board Diagnostics ("OBD") port 304, and vehicle telematics sensors 306. The data collection device 104 is connected to the vehicle 102 via an OBD port connector 322 connected to the OBD port 304 to receive telematics data and other information. The data collection device 104 includes a CPU 310, a GNSS receiver 312, an accelerometer 314, memory 316, a user interface 318, and a wireless communications device 320. The CPU 310 is in communication with the other elements of the data collection device 104 to facilitate the operation of the data collection device 104. The CPU can also be configured to process data received from the GNSS receiver 312, the accelerometer 314, and the OBD port connector 322. Data processing may include calculating risk and/or maintenance scores, calculating safety ratings, calculating intermediate values for determining insurance premium discounts, or encrypting data sent by the wireless communications device 320.

The Global Navigation Satellite System ("GNSS") receiver 312 includes an antenna and associated signal processing circuitry for receiving signals from GNSS satellites, such as the satellites numbered 1 through n in FIG. 1, and determining its location from the signals. GNSS satellites may be, for example, GPS, GLONASS, Galileo, or Beidou satellites which send time and orbital data from which the data collection device 104 can calculate its location. In some configurations, the CPU 310 calculates the location of the vehicle from data from the receiver 312. The CPU 310 can pull location data from the GNSS receiver 312 at set time intervals, such as every 0.1 seconds, 0.2 seconds, 0.5 seconds, 1 second, 2 seconds, 7 seconds, or 10 seconds. The CPU 310 sends the location data to the memory 316 along with a time and date stamp indicating when the vehicle was at the location. In some embodiments, the GNSS receiver 312 may be part of a separate GNSS device used by the driver for obtaining driving directions. In this case, the GNSS receiver 312 transmits data to the data collection device 104 though a wired connection or a wireless connection, e.g., BLUETOOTH or Wi-Fi.

The accelerometer 314 is a device that measures proper acceleration. Data collected from an accelerometer 314 may include or be used for obtaining the g-force, acceleration, orientation, shock, vibration, jerk, velocity, speed, and/or position of the vehicle. Some or all of these types of data are received or calculated by the CPU 310. The CPU 310 may collect data at intervals such as every 0.1 seconds, 0.2 seconds, 0.5 seconds, 1 second, 2 seconds, 7 seconds, or seconds and store the data in the memory 316. Each data point is time and date stamped and/or location stamped. In some embodiments, the CPU 310 determines intervals between data stored in the memory 316 based on trends in the data. The rate of data collection may vary based on vehicle behavior; for example, if a driver is travelling along a straight road at a consistent speed, the CPU 310 may save data less frequently than if the driver is making frequent turns. In some embodiments, only "exception data" evident of safety events or other unusual driving behavior is stored. For example, the CPU 310 may only save accelerations, decelerations, hard turns, speeds, lane change speeds, etc. with rates above a certain threshold.

The OBD port connector 322 is used to collect data from the vehicle computer 302 and/or vehicle telematics sensors 306 via OBD port 304. The vehicle computer 302 may provide information about the vehicle's speed, the number of miles traveled, whether the vehicle is running or not, seatbelt usage, airbag deployment, and vehicle diagnostics. Vehicle diagnostics data can be used to determine whether a safety event was caused by the driver's actions or related to a vehicle malfunction, such as low tire pressure, low oil pressure, high engine temperature, loss of power, and stalling. The vehicle may contain additional telematics sensors 306 for, e.g., maintenance events, vehicle tracking, monitoring gasoline consumption, and vehicle safety. Data obtained by the data collection device 104 from the vehicle computer 302 and telematics sensors 306 via the OBD port 304 can supplement or be used instead of data collected by the GNSS receiver 312 and/or accelerometer 314. In some embodiments, the data collection device 104 turns on automatically when the vehicle is turned on; the data collection device 104 may be powered by the vehicle 102.

The data collection device 104 also includes a wireless communications device 320 for sending collected data, including data indicative of maintenance events, to and receiving commands from the data processing service 106 and/or insurance company system 108 via the network 150. The data collection device 104 may also be configured for communication with the driver or a passenger via user interface 318. The user interface 318 includes output components, such as a screen or speakers, and input components, such as a touch screen, keyboard, or microphone. The user interface 318 can output risk data, route summary data, vehicle diagnostics data, and any data collected from the GNSS receiver 312, accelerometer 314, and/or OBD port 304. In some embodiments, the data collection device 104 is also a navigation device that can calculate and display a route to a destination inputted by the user.

Figure 4:
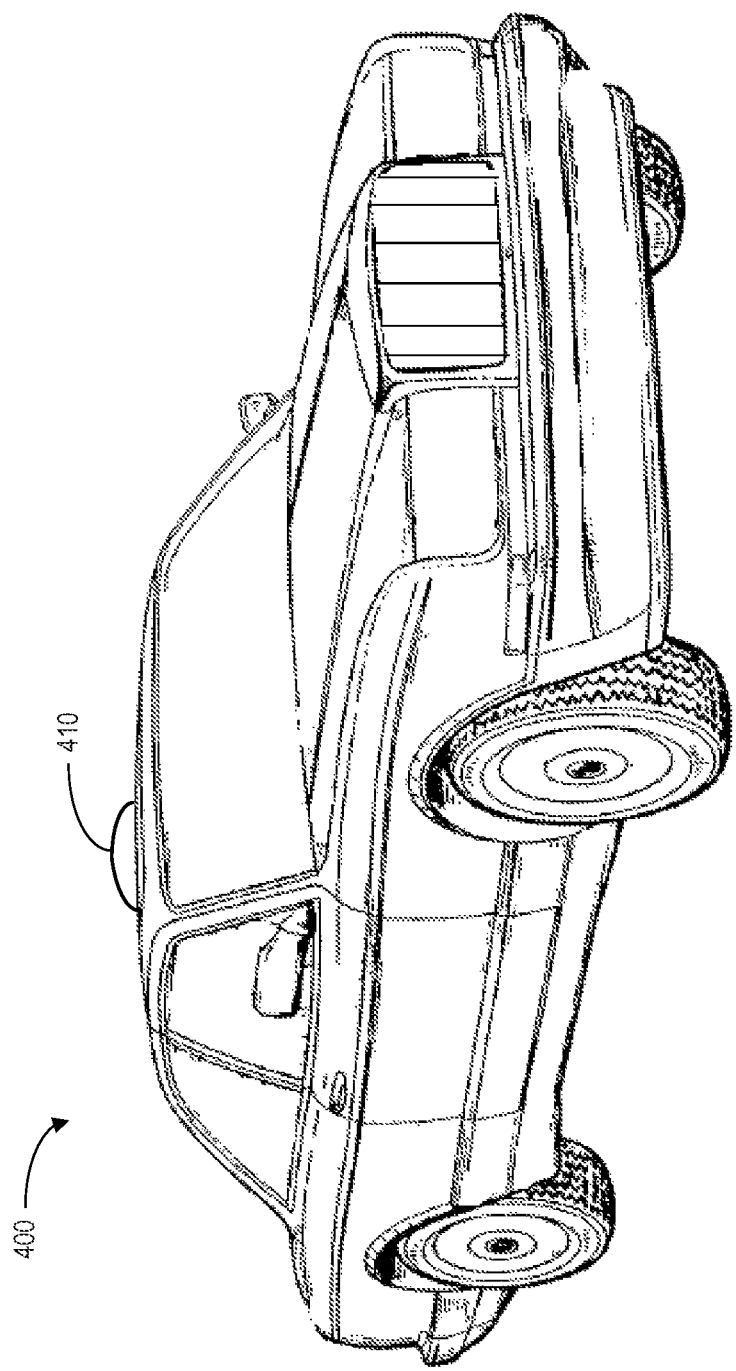
FIG. 4 illustrates an automobile in accordance with some embodiment of the invention.

The vehicle 102 and data collection device 104 may be associated with, for example, an automobile. For example, FIG. 4 illustrates an automobile 400 in accordance with some embodiment of the invention. The automobile 400 includes one or more sensors 410 that may be used to collect telematics information, such as a GNSS receiver or similar device. Note that telematics information might instead be associated with, for example, a motorcycle, a recreational vehicle, a boat, an airplane, etc. Further note that other embodiments might instead be associated with a residence and/or one or more appliances or other devices associated with a residence.

Figure 5:
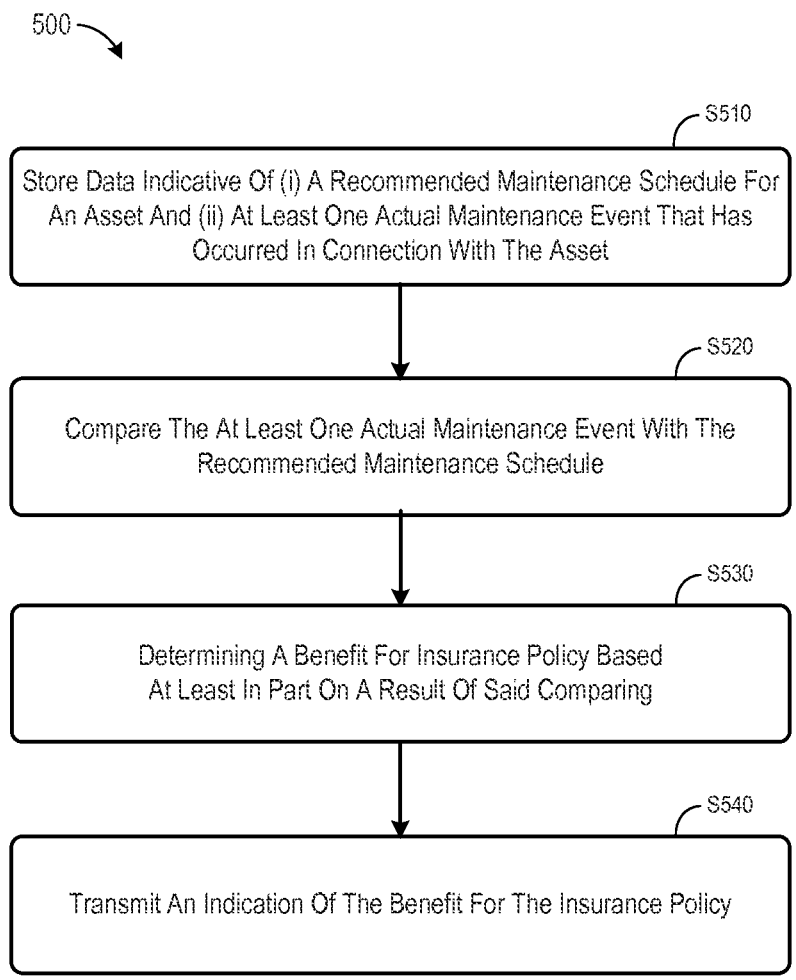
FIG. 5 is a flowchart of a method according to an illustrative embodiment of the invention.

FIG. 5 is a flowchart of a method 500 for determining a benefit for an insurance policy associated with an asset owned by an owner. The insurance policy might comprise either an existing insurance policy or a potential insurance policy to be offered to the owner. The benefit for the insurance policy might be associated with, for example, a reduced premium amount, an increased coverage amount, a reduced deductible amount, or additional insurance coverages. The method 500 can be performed by the data collection device 104, the data processing service 106, the insurance company system 108, or any combination of these. At S510, a computer memory may store data indicative of (i) a recommended maintenance schedule for the asset and (ii) at least one actual maintenance event that has occurred in connection with the asset. The data indicative of the recommended maintenance schedule may be, according to some embodiments, retrieved from a database storing information determined by a manufacturer of the asset. Moreover, the data indicative of the at least one actual maintenance event may be received via at least one of: (i) the owner via a web page portal, (ii) the owner via a telephone call, (iii) a service technician who performed a maintenance procedure for the asset, and (iv) a report received from a device associated with the asset (e.g., an electric vehicle might self-report maintenance events).

At S520, The at least one actual maintenance event may be compared with the recommended maintenance schedule. The appropriate benefit for the insurance policy may be determined for the insurance policy at S530 based at least in part on a result of said comparing. At S540, an indication of the benefit for the insurance policy may be transmitted, such as by displaying the benefit on a web page. According to some embodiments, the system may output to the owner an indication of a suggested maintenance event for the asset (e.g., that an oil change should be performed). According to some embodiments, the system may further automatically initiate an insurance workflow process in an external workflow system as a result of the comparison at S520. For example, an external mailing system may be prompted to automatically generate a letter to be mailed to the asset owner. As another example, a sales agent might automatically receive a report from an insurance enterprise reporting server including the result of the comparison.

According to some embodiments, the asset is an automobile and the insurance policy is an automobile insurance policy In this case, the maintenance event might be associated with at least one of: (i) an oil change, (ii) an engine tune-up, (iii) brake-pad replacement, (iv) a battery check, (v) an emissions test, (vi) an oil filter change, (vii) a tire rotation, and (viii) a check-up associated with a pre-determined mileage threshold. Moreover, the indicative of the recommended maintenance schedule might be determined based at least in part on: (i) a year of manufacture, (ii) an automobile manufacturer identifier, or (iii) an automobile model.

According to other embodiments, the asset is associated with a residence and the insurance policy is a homeowner's insurance policy. For example, the asset might be associated with associated with one or more of: (i) a heating system, (ii) a cooling system, (iii) a water pump, (iv) a washing machine, (v) a dryer, or (vi) a kitchen appliance. Moreover, the data indicative of the recommended maintenance schedule might be determined based at least in part on: (i) a year of manufacture, (ii) an asset manufacturer identifier, or (iii) an asset model.

According to still other embodiments, the asset is a vehicle and the computer memory further stores data indicative of telematics data received from a sensor within the vehicle, the telematics data comprising at least one of geo-position information of the vehicle and vehicle kinematics data, and the benefit is determined based on the data indicative of the telematics data. For example, the data indicative of telematics data could include at least one of: (i) times of day associated with driving, (ii) velocities associated with driving, (iii) distances associated with driving, (iv) weather information, (v) traffic information, and (vi) de-acceleration events. According to some embodiments, such telematics data is received from a sensor within the vehicle. As used herein, a sensor may be "within" a vehicle if it is attached to the vehicle (e.g., either inside or outside the body of the vehicle), is powered by the vehicle, or is otherwise inside or associated with the vehicle. To obtain telematics data, data from receivers and sensors such as GNSS receiver 312, accelerometer 314, vehicle computer 302, and vehicle telematics sensors 306 may be collected by the data collection device 104 and stored in the memory 306 of the data collection device 306 and/or sent to the data processing service 106 or insurance company system 108.

According to some embodiments, maintenance information is displayed on a map display. The maintenance data might include, for example, services that need to be performed in connection with the asset. Moreover, according to some embodiments an insurance platform might output an indication of a suggested maintenance event on a map display along with a discount goal for the insurance premium of the automobile insurance policy. For example, the event might be to replace brake pads to achieve a 2% discount for an insurance premium. According to some embodiments, information about maintenance data might be automatically provided via a social network site (e.g., to help encourage a group of drivers to improve risky maintenance habits).

Figure 6:
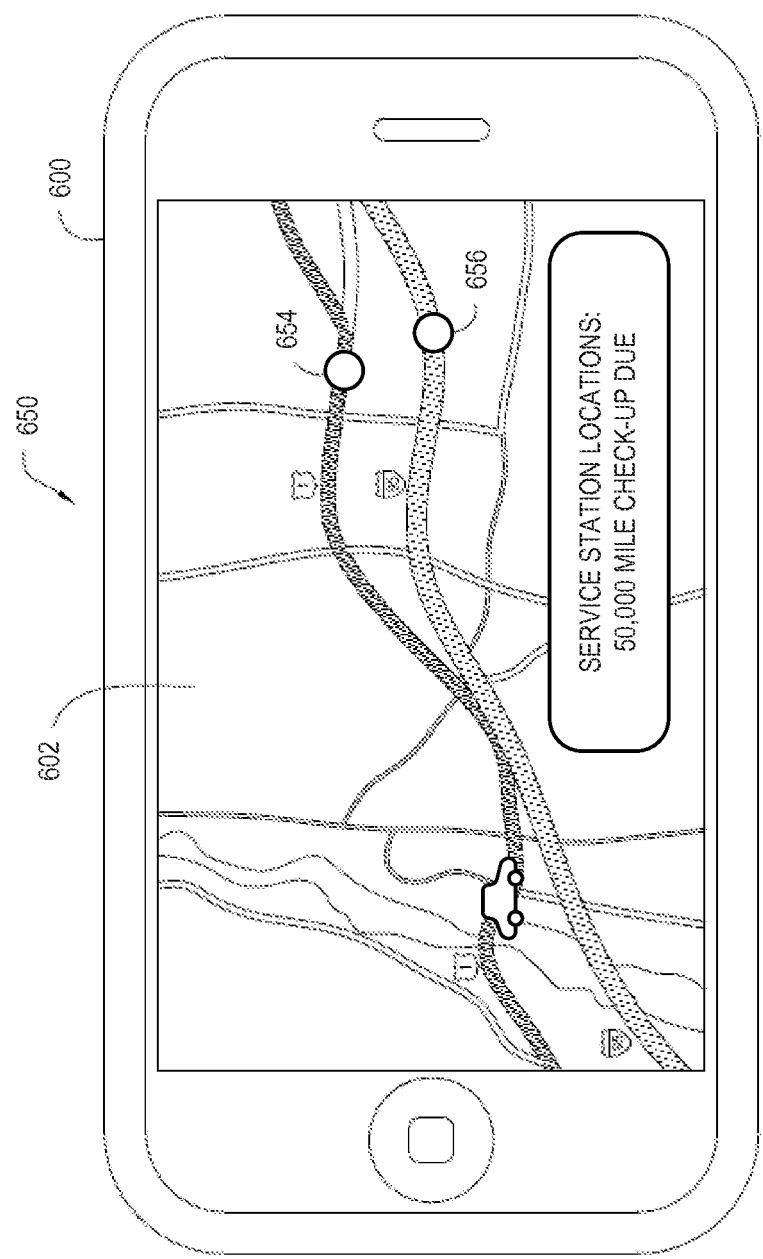
FIGS. 6 through 9 illustrate displays in accordance with some embodiments described herein.
Figure 7:
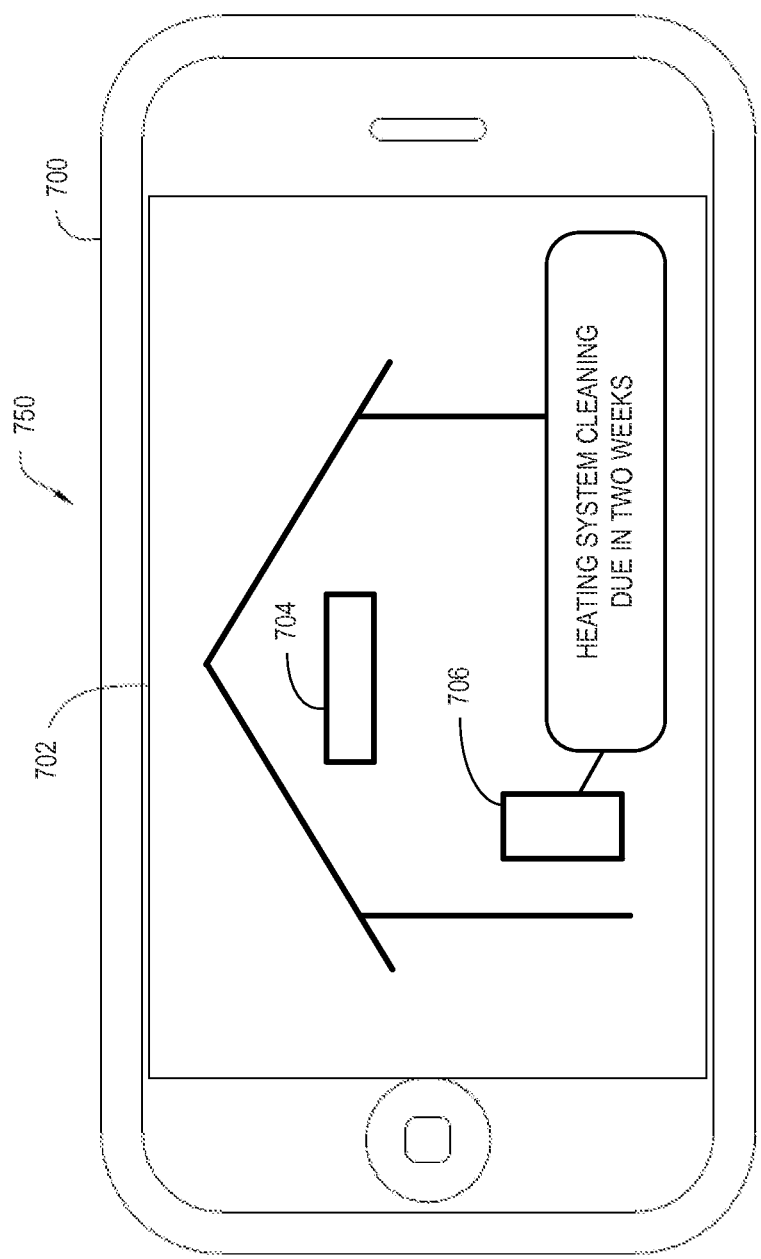

According to some embodiments, information about maintenance events may be displayed to a driver on a map display. For example, referring now to FIG. 6, a diagram 650 depicting a user interface 602 is shown. The user interface 602 may be displayed on device 600 such as a mobile telephone, PDA, personal computer, or the like. For example, the device 600 may be a PC, an iPhone® from Apple, Inc., a BlackBerry® from RIM, a mobile phone using the Google Android® operating system, or the like. The user interface 602 depicts a portion of a map showing a portion of Fairfield County in the State of Connecticut. The user interface 602 may display locations 654, 656 where an owner can take the automobile to perform a maintenance event (e.g., locations of gas stations). In this way, a driver may be alerted and encouraged to maintain his or her vehicle in good operational condition. As another example, referring now to FIG. 7, a diagram 750 depicting a user interface 702 is shown. The user interface 702 depicts an owner's house. The user interface 702 may display systems such as an air conditioning system 704 and heating system 706. Moreover, the user interface 702 may indicate which systems 704, 706 require maintenance. In this way, a home owner may be alerted and encouraged to maintain his or her residence in good operational condition.

Figure 8:
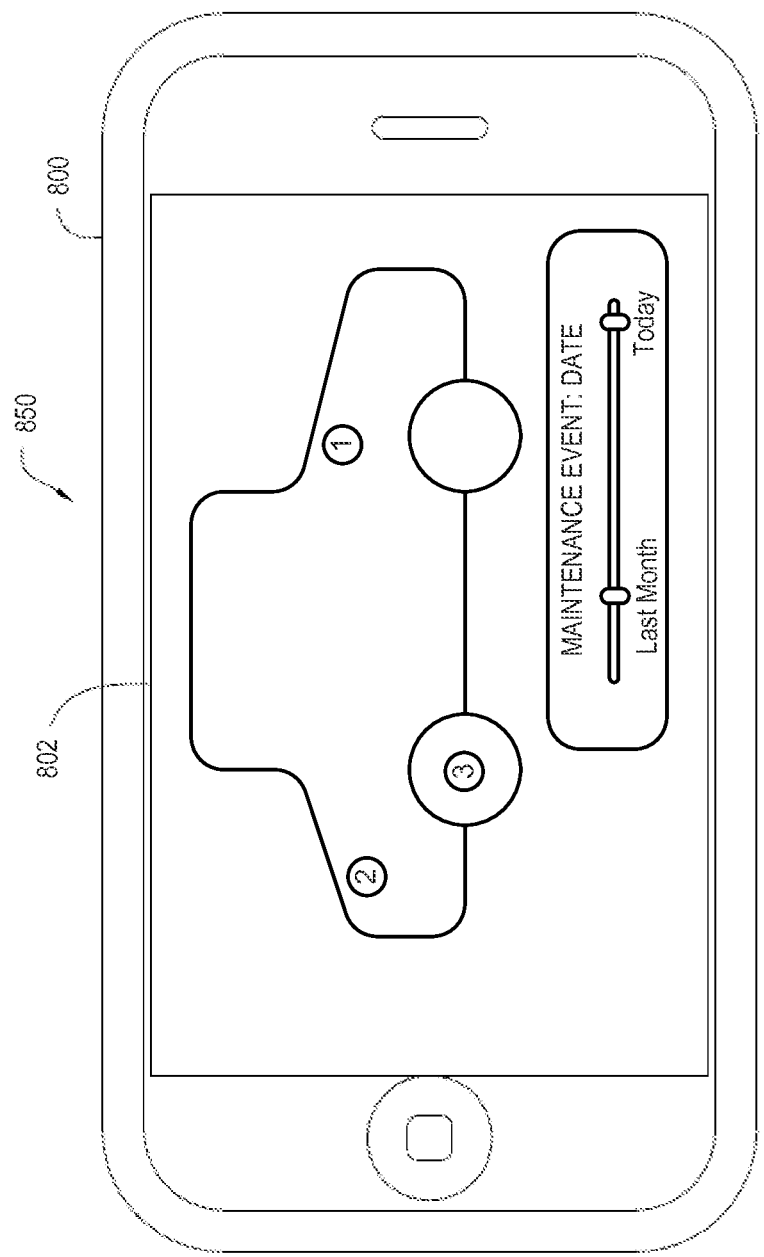

Note that maintenance requirements may change over time. Thus, according to some embodiments an owner may interact with a display to view maintenance events associated with a selected range of dates and/or times. For example, referring now to FIG. 8, a diagram 850 depicting another user interface 802 is shown. As before, the user interface 802 may be displayed on device 800 such as a mobile telephone. The user interface 802 may display to an owner of an automobile the various systems and elements that will require maintenance during a particular period of time (e.g., during the prior 24 hours, the prior week, the prior month, the prior year, etc.). For example, as illustrated in FIG. 8 a vehicle might require (1) an oil change, (2) electronic battery maintenance, and (3) a tire inflation check. According to some embodiments, a driver may interact with a "sliding scale" bar to select which period of time should be used to filter the maintenance events.

Figure 9:
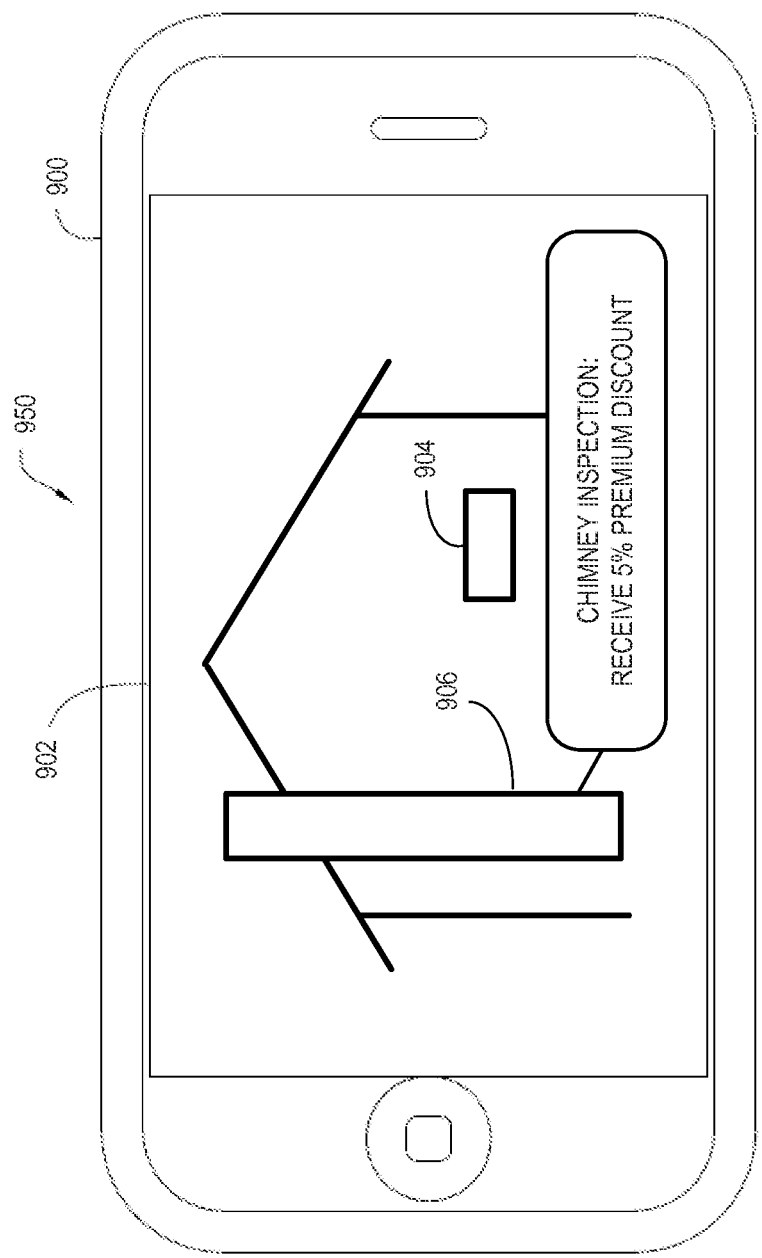

In some cases, an owner might be interested in and/or motivated by being informed of the relations between maintenance events and insurance benefits. For example, referring now to FIG. 9, a diagram 950 depicting a user interface 902 including an owner's residence is shown. The user interface 902 may display systems such as stovetop 904 and a chimney 906. Moreover, the user interface 902 may indicate which systems 904, 906 currently require maintenance. In this way, a home owner may be further alerted and encouraged to maintain his or her residence in good operational condition.

Figure 10:
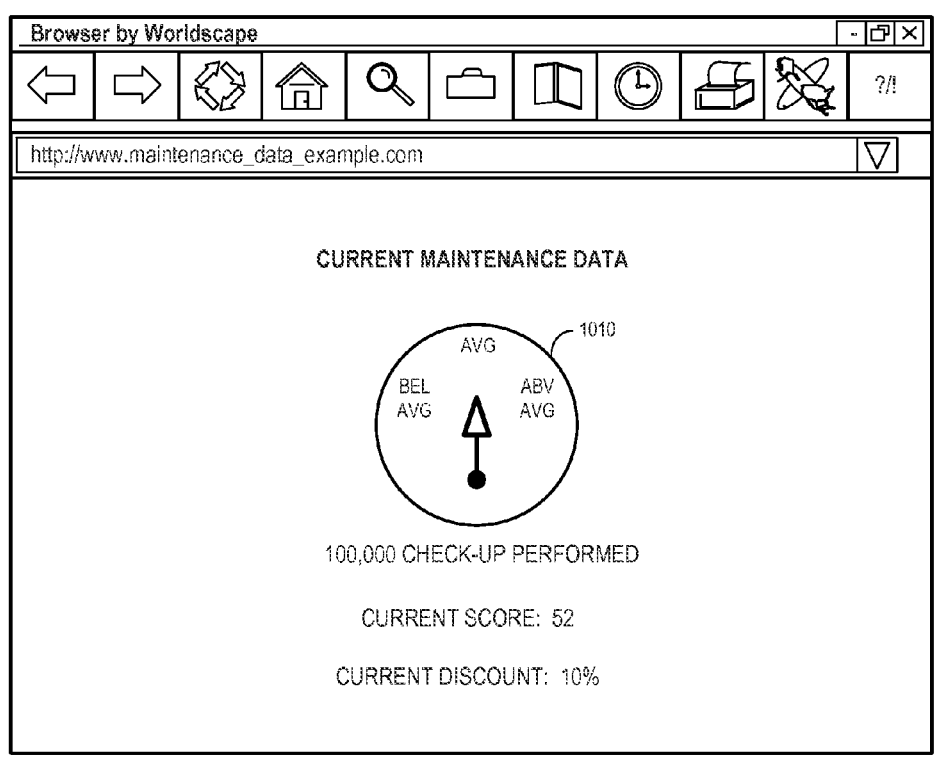
FIGS. 10 and 11 illustrate current maintenance data displays according to some embodiments.

According to some embodiments, an owner might be interested in his or her overall performance in connection with one or more types of maintenance events and/or how that performance compares to other owners, how that performance is modifying his or her current insurance premium discount, etc. FIG. 10 illustrates a current maintenance data display 1000 according to some embodiments. In particular, the display 1000 includes a graphical representation 1010 of information about particular risk variables derived from maintenance data which may be categorized as "below average," "average," or "above average" from a risk perspective. The display 1100 also includes a current score (e.g., calculated at least in part based on the risk variable) and a current discount (e.g., determined based on the current score). Note that the graphical representation 1010 might instead be a sliding scale, letter grade ("B+"), or any other type of indication. In some embodiments described herein, an owner's maintenance of his or her asset may be used to determine insurance benefits for a policy associated with that asset. Note, however, that any of the embodiments described herein may determine a benefit for another insurance policy, such as a policy associated with a different asset, owner, or third party. For example, a maintenance event performed by a driver for an automobile could adjust benefits associated with other automobiles and/or other drivers.

Figure 11:
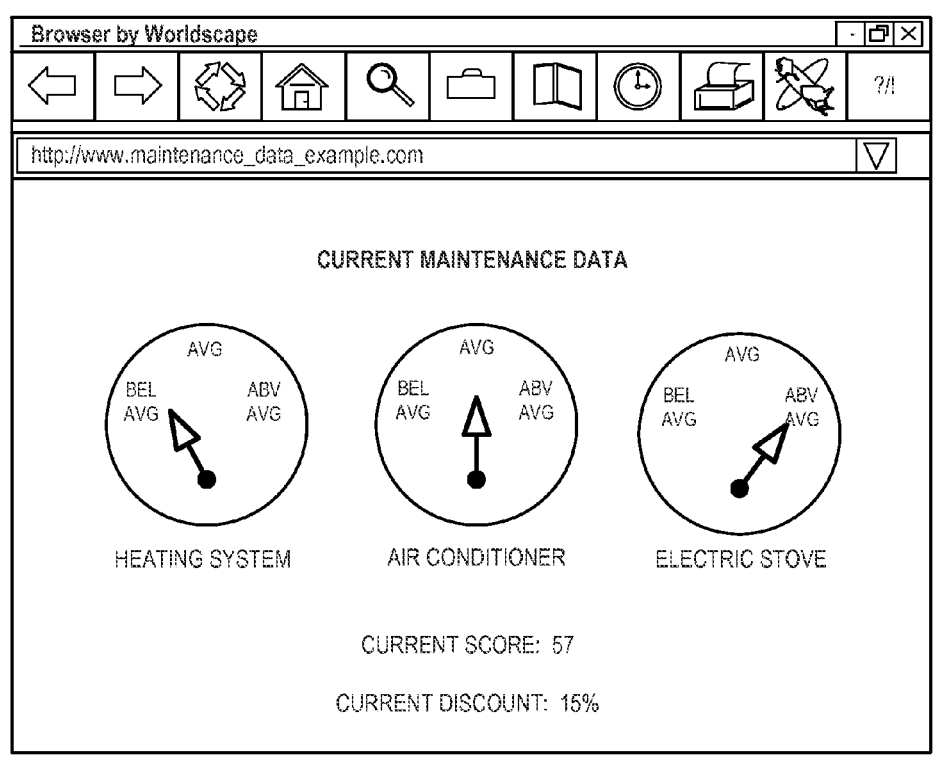

FIG. 11 illustrates another current maintenance data display 1100 according to some embodiments. In particular, the display 1100 includes a graphical representation of information about three different systems (e.g., a heating system, air conditioner, and electric stove), a current score (e.g., calculated based on the maintenance variables) and a current discount (e.g., determined based on the current score). The current discount might, according to some embodiments, represent the final discount. According to some embodiments, the current discount might be calculated in substantially real time or be recalculated using new maintenance data at certain time periods, e.g., every month, every year, every two years, etc. In some embodiments, both prospective pricing and retroactive pricing are used. For example, a customer being continually monitored can be receive a premium discount for a time period based on one or more past maintenance events, and if the customer's actual score rating for the time period was greater than or less than the expected rating, an adjustment may be applied as appropriate.

Figure 12:
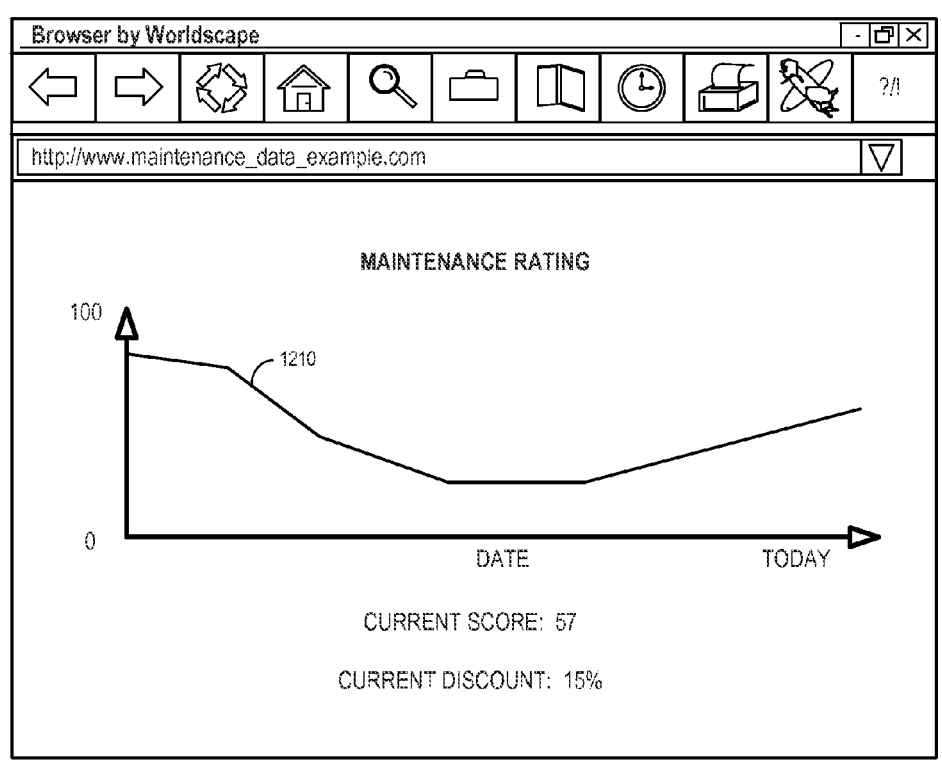
FIG. 12 illustrates a maintenance rating display according to some embodiments.

Note that an owner's maintenance rating will change over time based on his or her habits. FIG. 12 is an example of a maintenance rating display 1200 that might be provided to an owner according to some embodiments. In particular, the display 1200 includes a graph 1210 showing the maintenance rating over a particular period of time (e.g., over the last month or year). According to some embodiments, an owner may select the period of time depicted on the graph 1210. Such a maintenance rating display 1200 may encourage an owner to improve his or her score and reduce risk.

Figure 13:
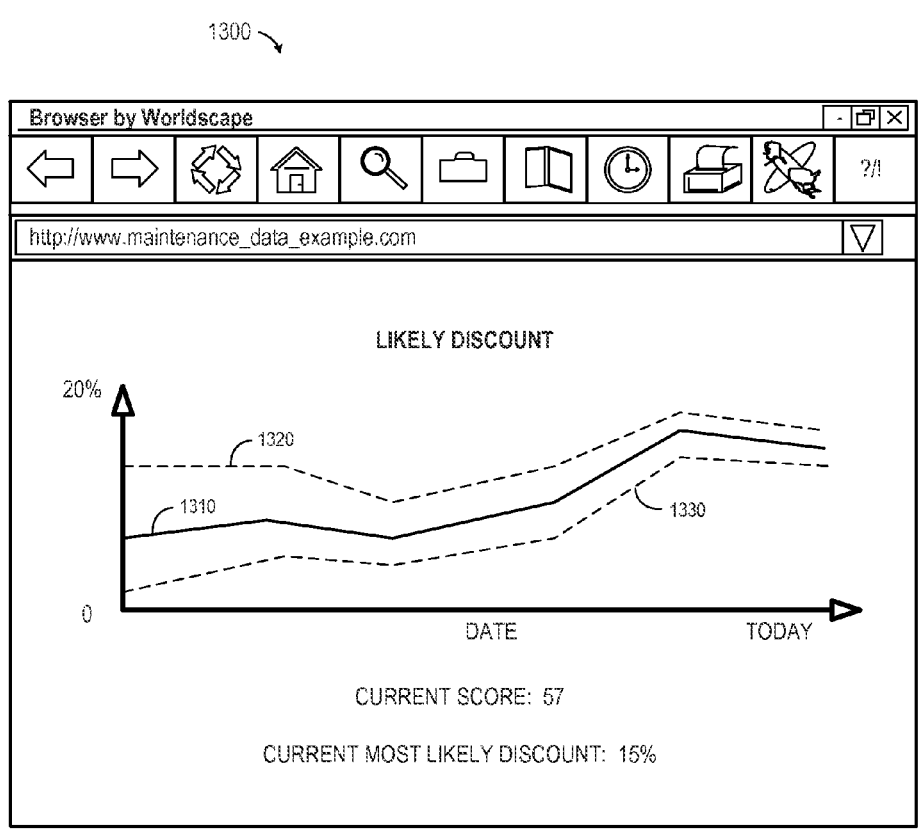
FIG. 13 illustrates a likely discount display according to some embodiments.

An insurance premium discount may be based at least in part on, for example, maintenance data, telematics data, a driver's safety score, and/or events that occur over time. According to some embodiment, a final discount value may not be determined until data has been collected for a predetermined period of time and/or a predetermined number of miles. Even before the final discount value is determined, a likely discount value might be calculated based on a driver's known habits. For example, during a trial or initial period, a likely discount value might be calculated based on events that have occurred during the trial period. FIG. 13 illustrates a likely discount display 1300 according to some embodiments. In particular, the display 1300 includes a current most likely discount 1310 calculated based on the existing data that has been collected for an owner. Moreover, an upper likely discount 1320 and lower likely discount 1330 may also be displayed (e.g., there might be a 90% chance that the owner's final discount will not exceed the upper likely discount 1320). Note that as more data is collected over time, the upper and lower likely discounts 1320, 1330 might converge until, at the end of a trial period, the final premium discount is actually computed for the owner.

Figure 14:
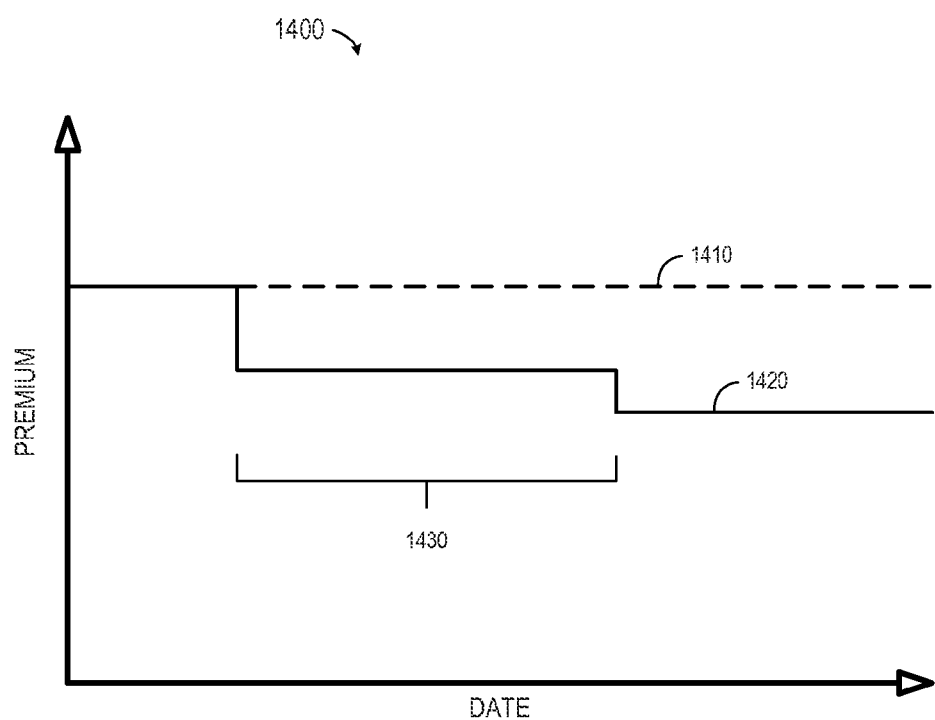
FIG. 14 illustrates how an insurance premium might change over time according to some embodiments.

According to some embodiments, an initial insurance premium discount may be provided to an owner while data is collected. FIG. 14 is an illustration 1400 of how an insurance premium might change over time according to some embodiments. A baseline insurance premium associated with what an owner would pay if he or she did not participate in a maintenance program is represented by a dashed line 1410 in FIG. 14 along with a solid line 1420 representing his or her actual premium. After the owner agrees to participate in the program, maintenance data is collected during a pre-determined period of time 1430 (e.g., three months). During this time, the owner's insurance premium is reduced by an initial discount amount. After the pre-determined period of time 1430, a final discount amount is determined and applied to his or her insurance premium (and the final amount might be more or less than the initial discount depending on his or her habits). Note that appropriate benefit adjustments might be associated with an insurance policy to be newly issued, a renewal of an existing insurance policy, and/or a periodic evaluation during a term of an existing insurance policy. For example, maintenance activity might be automatically evaluated on a quarterly basis and used to create delta adjustments to existing insurance policy values (e.g., a driver might be continue to receive a 10% insurance premium discount if no major maintenance events were missed during that quarter).

Figure 15:
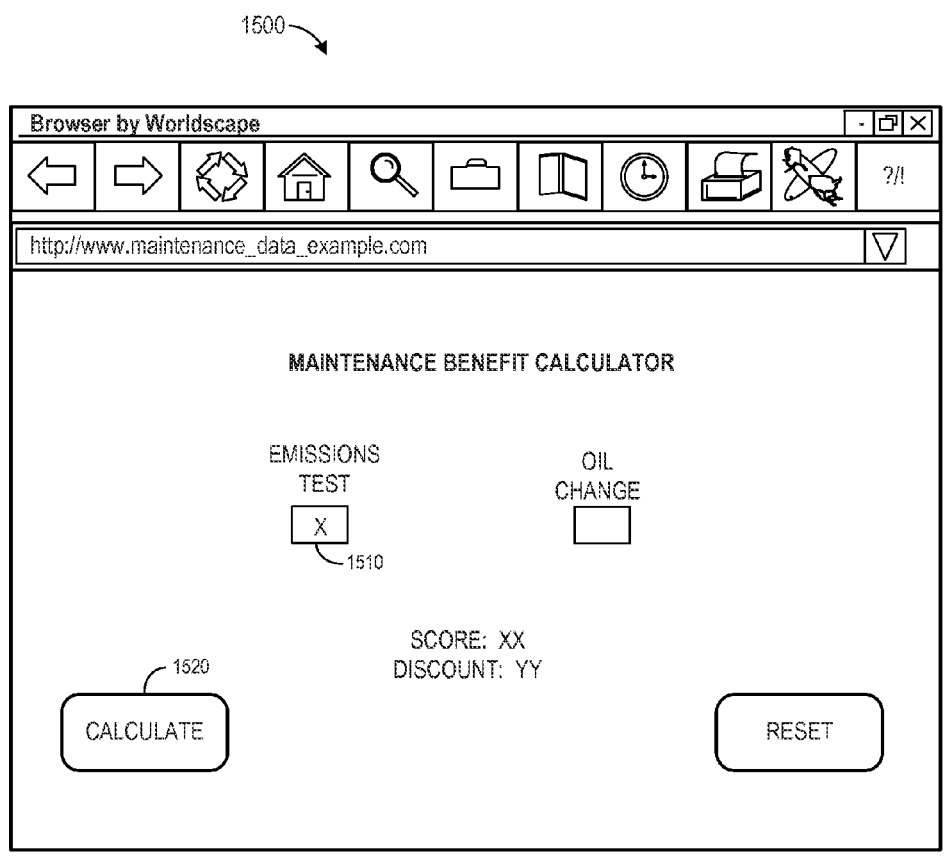
FIGS. 15 through 17 are examples of calculator displays in accordance with some embodiments described herein.

It may be difficult for an owner to predict or understand exactly how his or her maintenance behavior will adjust a safety score or premium discount value. According to some embodiments, a maintenance benefit calculator may be provided for an owner to reduce this problem. For example, FIG. 15 is an example of a maintenance benefit calculator 1500 display according to some embodiments. The maintenance benefit calculator 1500 includes an entry box 1510 where an owner can enter predicted safety events that he or she expects to perform (e.g., by placing an "X" in the emissions test entry box 1510). After entering these values, the owner may activate a "calculate" icon 1520 causing the system to display a predicted score and/or premium discount value (or any other insurance benefit) based on the predicted maintenance events. In this way, an owner may be encouraged to perform maintenance events and reduce risk.

Figure 16:
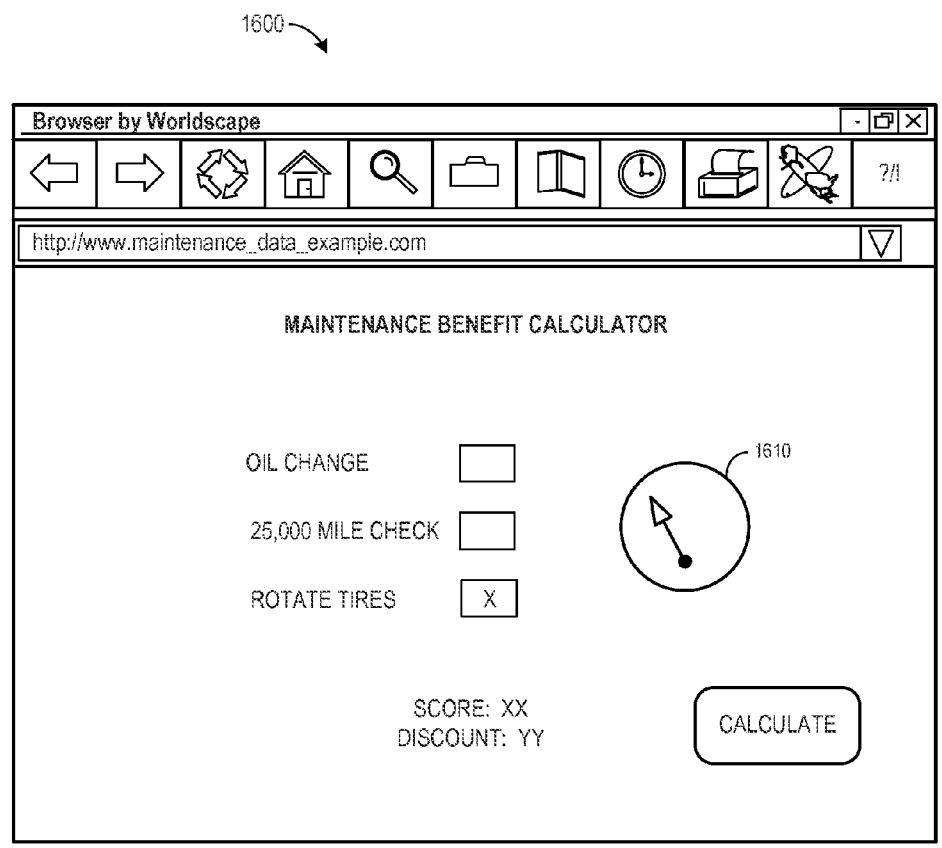

As another example, FIG. 16 is a maintenance benefit calculator 1600 where an owner can predict multiple maintenance events. In the example of FIG. 16, an owner predicts that he or she will have the tires rotated but will not perform an oil change or a 25,000 check up. According to other embodiments, a graphical representation 1610 may be used to reflect the entered information and/or may be used instead by the driver to enter information (e.g., by rotating a gauge or dial). Based on this information, the calculator 1600 may generate and display a predicted score and/or discount value.

Figure 17:
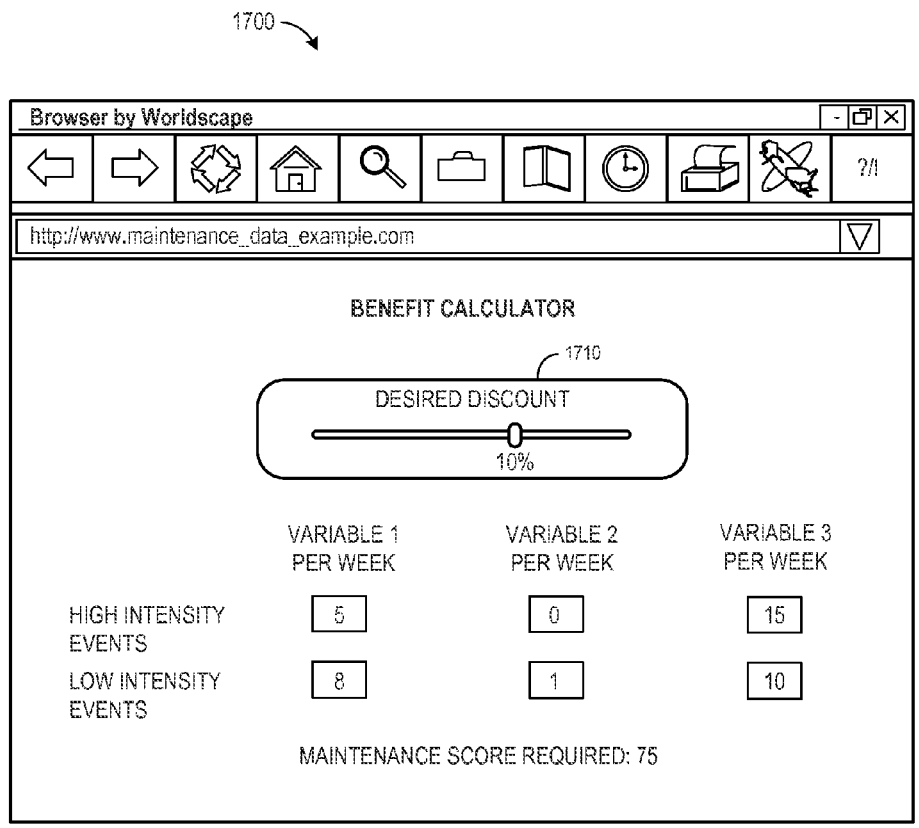

According to other embodiments, a driver might enter a desired score or premium discount value. For example, FIG. 17 is an example of an insurance benefit calculator 1700 in accordance with some embodiments described herein. The calculator 1700 may receive from an owner a desired premium discount via a sliding scale 1710 (e.g., in the example of FIG. 17 the driver is interested in receiving a 10% discount). Based on the desired discount, the calculator 1700 generates a number of telematics safety events for various types of events and/or various levels of severity. For example, the calculator 1700 might indicate that 5 high intensity hard brake events should be experienced per week in order for the driver to receive a 10% discount. The calculator also includes a required maintenance score that the owner must achieve in order to receive the desired discount. The calculator 1700 may be, for example, associated with a web page, a smartphone application, and/or a kiosk and may encourage drivers to adopt less risky driving habits.

Figure 18:
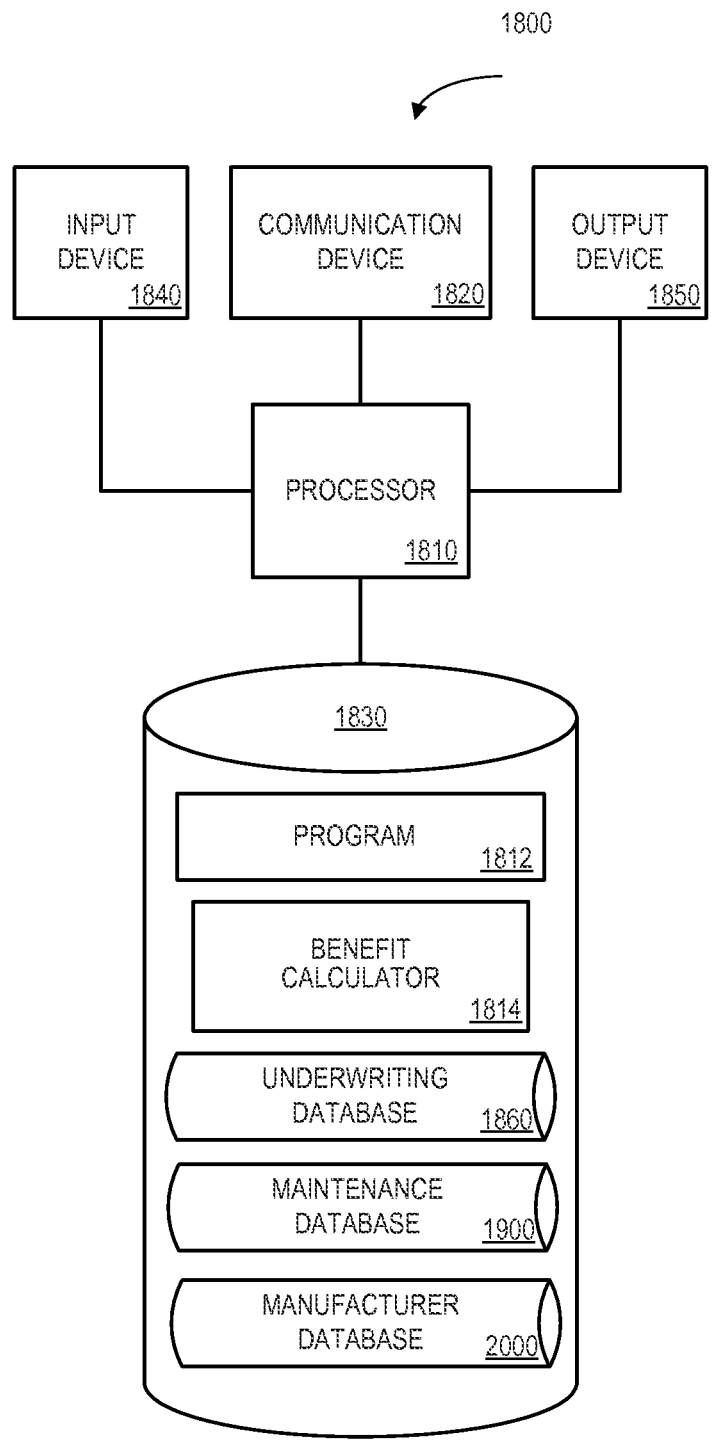
FIG. 18 is a block diagram of an insurance platform provided in accordance with some embodiments.

The processes described herein may be performed by any suitable device or apparatus. FIG. 18 is one example of an insurance platform 1800 according to some embodiments. The insurance platform 1800 may be, for example, associated with the system 108 of FIG. 1. The insurance platform 1800 comprises a processor 1810, such as one or more commercially available CPUs in the form of one-chip microprocessors, coupled to a communication device 1820 configured to communicate via a communication network (not shown in FIG. 18). The communication device 1820 may be used to communicate, for example, with one or more remote vehicles or third party services. The insurance platform 1800 further includes an input device 1840 (e.g., a mouse and/or keyboard to enter insurance discount information) and an output device 1850 (e.g., a computer monitor to display aggregated insurance reports and/or results to an administrator).

The processor 1810 also communicates with a storage device 1830. The storage device 1830 may comprise any appropriate information storage device, including combinations of magnetic storage devices (e.g., a hard disk drive), optical storage devices, and/or semiconductor memory devices. The storage device 1830 stores a program 1812 and/or scoring system 1814 for controlling the processor 1810. The processor 1810 performs instructions of the programs 1812, 1814, and thereby operates in accordance with any of the embodiments described herein. For example, the processor 1810 may receive maintenance data from an owner, service station, or a vehicle. The processor 1810 may also analyze the maintenance data, and/or transmit discount information to a potential entity to be insured based at least in part on a computed risk score.

Referring again to FIG. 18, the programs 1812, 1814 may be stored in a compressed, uncompiled and/or encrypted format. The programs 1812, 1814 may furthermore include other program elements, such as an operating system, a database management system, and/or device drivers used by the processor 1810 to interface with peripheral devices.

As used herein, information may be "received" by or "transmitted" to, for example: (i) the insurance platform 1800 from another device; or (ii) a software application or module within the insurance platform 1800 from another software application, module, or any other source.

In some embodiments (such as shown in FIG. 18), the storage device 1830 stores an underwriting database 1860, a maintenance database, 1900, and/or a manufacturer database 2000. An example of databases that may be used in connection with the insurance platform 1800 will now be described in detail with respect to FIGS. 19 and 20. Note that the database described herein is only one example, and additional and/or different information may be stored therein. Moreover, various databases might be split or combined in accordance with any of the embodiments described herein.

Referring to FIG. 19, a table is shown that represents the maintenance database 1900 that may be stored at the insurance platform 1800 according to some embodiments. The table may include, for example, entries identifying owners or assets. The table may also define fields 1902, 1904, 1906, 1908, 1910 for each of the entries. The fields 1902, 1904, 1906, 1908, 1910 may, according to some embodiments, specify: an owner identifier 1902, a policy identifier 1904, maintenance events 1906, dates and times 1908, and locations 1910. The information in the maintenance database 1900 may be created and updated, for example, based on information received from an asset owner, a service provider, and/or an asset sensor.

The owner identifier 1902 may be, for example, a unique alphanumeric code identifying a customer or potential customer (e.g., a person or business). The policy identifier 1904 might represent an insurance product that may be offered to the user associated with the owner identifier 1902. The maintenance events 1906 might indicate a type of maintenance that has actually been performed for that asset. The date and time 1908 might indicate when the event occurred and the location 1910 might indicate where the event occurred (e.g., a latitude and longitude, street address, or gas station identifier). The information in the maintenance database 1900 may then be used to calculate a benefit for the owner.

According to some embodiments, an owner's behavior is compared to the actions that are recommended by an asset's manufacturer. For example, different models of automobiles may need to have the oil changed after different periods of time. Moreover, owner who complies with a manufacturer's recommendations may receive a better insurance benefit as compared to owners who do not. Referring to FIG. 20, a table is shown that represents the manufacturer database 2000 that may be stored at the insurance platform 1800 according to some embodiments. The table may include, for example, entries identifying assets that need to be maintained. The table may also define fields 2002, 2004, 2006, 2008, 2010 for each of the entries. The fields 2002, 2004, 2006, 2008, 2010 may, according to some embodiments, specify: an asset identifier 2002, a policy identifier 2004, a manufacturer 2006, recommended maintenance 2008, and one or more triggers 2010. The information in the manufacturer database 2000 may be created and updated, for example, based on information received from user manuals, manufacturer web sites, etc.

The asset identifier 2002 may be, for example, a unique alphanumeric code identifying an asset (e.g., a heating system). The policy identifier 2004 might represent an insurance product that may be offered to an owner in connection with the asset identifier 2002. The manufacturer 2006 may indicate an entity that created the asset (or provides recommendations for that asset), such as "Heater Corp." and "Jones Incorporated" which both produce heating systems. The recommended maintenance 2008 might indicate a type of maintenance event that should be performed for that asset. The trigger 2010 may indicate when the recommended maintenance 2008 should be performed. For example, heating systems manufactured by Heater Corp. should be cleaned after 5,000 hours of use while heating systems manufactured by Jones Incorporated should be cleaned after 2,500 hours of use.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Some embodiments described herein determine a benefit for an insurance policy associated with an asset by comparing maintenance events with a maintenance schedule. The schedule may be based on, for example, manufacturer recommendations. According to some embodiments, other information may be used to create and/or adjust a maintenance schedule. For example, a computerized predictive model might be trained on a set of training data. The training data might include, for example, insurance claims information and/or content retrieved from websites, such as company websites; ratings websites such as Consumer Reports, Eopinions, and Yelp; and social networking sites, such as Facebook or LinkedIn. Any website that includes information about assets may be used as training data. Any combination of techniques for web scraping, such as text grepping, HTTP programming, DOM parsing, HTML parsing, or use of web scraping software, may be used to retrieve web content. The content may comprise text, images, videos, animation, or any other website content. The content may be published on the website using HTML, SVG, Java applets, Adobe Flash, Adobe Shockwave, Microsoft Silverlight, or other web formats or applications. A content processor may be configured to retrieve the website content in some or all of the aforementioned formats or any other format.

In order to train the computerized predictive model, the extracted website data may be processed in order to identify indicators associated with an asset and/or maintenance event. For text data, natural language processing techniques may be used to organize the text. The content processor may filter stop words, such as articles or prepositions, from the text. In one embodiment, the content processor may only retain words of a certain part of speech, such as nouns and/or verbs. The remaining words may be reduced to their stem, base, or root form using any stemming algorithm. Additional processing of the website content may include correcting spelling errors, identifying synonyms of words, performing co-reference resolution, and performing relationship extraction. Once the words have been processed, they may be counted and assigned word frequencies or ratios.

In addition to website content, each asset may be assigned at least one maintenance event, typically from a reference manual or owner's guide. The maintenance events may be provided by a third party, such as a service provider and/or assigned by the insurance company. If the maintenance events are provided by a third party, the insurance company may review the assigned maintenance events and confirm or adjust them. More than one maintenance event may be assigned to an asset.

The computerized predictive model may be trained to classify website content as indicative of one or more industrial maintenance events, for example, using the word count or word frequency data described above. Because of the large amount of data and the many different types of maintenance events, Bayesian classifiers, particularly Naive Bayes classifiers and hierarchical Bayesian models, may be suitable, such as the Latent Dirichlet allocation model, which is a topic model that allows sets of observations to be explained by unobserved groups that explain why some parts of the data are similar. The text of a website or group of websites may be viewed as a mixture of various topics, and learning the topics, their word probabilities, topics associated with each word, and topic mixtures of documents may be a problem of Bayesian inference. The Latent Dirichlet allocation model is described in detail in the paper "Latent Dirichlet allocation" by David M. Blei, Andrew Y. Ng, and Michael I. Jordan (Journal of Machine Learning Research 3: pp. 993-1022, January 2003), incorporated herein by reference. Suitable statistical maintenance event methods also include random forests, random naive Bayes, Averaged One-Dependence Estimators ("AODE"), Monte Carlo methods, concept mining methods, latent semantic indexing, k-nearest neighbor algorithms, or any other suitable multiclass classifier. The selection of the classifier can depend on the size of the training data set, the desired amount of computation, and the desired level accuracy.

For assigning maintenance events to an asset using a trained predictive model, the system may first obtain a web address related to the asset. The web address may be input through an application, received from a third party data source, such as a vendor that collects and distributes information about assets, and/or be retrieved from an insurance company database. The system may include or be in connection with another database or data store to supply a web address. For example, a system memory may store web addresses of popular ratings or review websites, such as Consumer Reports, Eopinions, Yelp, etc., which can be searched to obtain a web address of a web page with published manuals and other information related to the asset. Similarly, a processing unit may automatically search the Internet using, for example, Google, Bing, Yahoo!, etc. and inputting the asset's name, possibly along with other information, such as model number. Such a search can return addresses of the asset's website and/or addresses of other websites related to the asset. In another embodiment, a processing unit may search social networking sites, such as Facebook or LinkedIn, that include information about the asset.

Next, a content processor may retrieve content from the website. The content may comprise text, images, videos, animation, or any other website content. The content may be published on the website using HTML, SVG, Java applets, Adobe Flash, Adobe Shockwave, Microsoft Silverlight, or other web formats or applications. A content processor may be configured for retrieving the website content in some or all of the aforementioned formats or any other format. The content processor may further be configured to convert the content to a format suitable for the computerized predictive model as necessary, according to, for example, the methods described above. In some embodiments, the content from multiple websites (e.g. a company website and one or more ratings websites) is obtained, or multiple pages on or linked from a company's website are obtained. Once the website content has been gathered and processed as necessary, it is then sent to a computerized predictive model processor. In one embodiment, the content processing element and computerized predictive model are located on the same physical processor. The content processor may flag certain words, such as "repair," "annual," or "preventive," that indicate that maintenance event might be appropriate and should be subject to further review.

Upon receiving the website content, a computerized predictive model may process the content according to a maintenance event method being used to determine at least one maintenance event for the asset. The industrial maintenance event may be for example, a check or replacement of a particular part. Depending on available data and desired resolution, the computerized predictive model may return major and/or minor maintenance actions. The computerized predictive model may also calculate a value, such as a confidence level or likelihood, indicating a level of certainty that a maintenance event should be associated with the asset. The computerized predictive model may also return an estimation error.

The one or more maintenance events identified by the computerized predictive model may then output to a business logic processor. From the output of the computerized predictive model, the business logic processor may determine an insurance risk of the asset when the event is (or is) performed.

The business logic processor may look up an insurance risk of a particular asset in a table. The insurance risk may be further based on additional information related to the asset, for example and without limitation, an asset price, a cost of a maintenance event, etc.

If the model outputs more than one maintenance event for an asset, the business logic processor can calculate an aggregate risk rating. The insurance risks associated with the maintenance events may be weighted by the confidence level or likelihood of each maintenance event and summed. Alternatively, the insurance risks may be weighted according to the rankings of the confidence level. There may be a set lower threshold of confidence of likelihood below which potential maintenance events are not considered. In other implementations, the insurance risk is simply the insurance risk of the event associated with the highest insurance risk, or alternatively the insurance risk of the most likely maintenance event. The insurance risk may depend on the type of coverage sought. In this case, each maintenance event may have different insurance risks for different types of coverage.

In some embodiments, the business logic processor is located on an underwriter's computer system, which receives the output of the computerized predictive model processor over a network. In other embodiments one or both of the computerized predictive model processor and the content processor are located on the underwriter's computer system as well. Note that any of the processes described herein might be performed in a remote "cloud" based computer system.

In addition, in certain embodiments, the insurance company can either augment the predictive model using other available data related to assets or build additional standalone predictive models from additional data. For example, data obtained from web scraping can be augmented with claims data by applying similar data scraping techniques to a claims database which includes descriptions of events causing insurance claims to be made, information about the assets involved, service reports, and/or loss amounts. Therefore, words identified in the claims database may be assigned heavier weights in the model as they may be more indicative of the types of claims that would be received in connection with an asset. In another example, upon receiving a claim, the insurance company may reevaluate the maintenance events of the asset to determine if it needs to be changed in the future. In this case, the insurance company system may determine or adjust a maintenance event by processing the claim data with a standalone predictive model trained on the claims database or a predictive model trained on both claim and web data.

Although specific hardware and data configurations have been described herein, not that any number of other configurations may be provided in accordance with embodiments of the present invention (e.g., some of the information associated with the databases described herein may be combined or stored in external systems).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:
1. A system for determining a benefit for an insurance policy associated with an asset owned by an owner, the system comprising:
   a computer memory for storing data indicative of (i) a recommended maintenance schedule for the asset, wherein the recommended maintenance schedule includes a plurality of recommended maintenance events, each recommended maintenance event being associated with servicing the asset in accordance with a recommended maintenance occurrence trigger to keep the asset in good operational condition, and (ii) at least one actual maintenance event that has occurred in connection with the asset; and a processor in communication with the memory, wherein the processor is configured for:
comparing the at least one actual maintenance event with the recommended maintenance schedule, including the recommended maintenance occurrence trigger,
determining the benefit for the insurance policy based at least in part on a result of said comparing, and
transmitting an indication of the benefit for the insurance policy.

2. The system of claim 1, wherein the insurance policy comprises either an existing insurance policy or a potential insurance policy to be offered to the owner.

3. The system of claim 1, wherein the benefit for the insurance policy is associated with at least one of: (i) a reduced premium amount, (ii) an increased coverage amount, (iii) a reduced deductible amount, (iv) additional insurance coverage, and (v) a delta adjustment to an existing insurance policy value.

4. The system of claim 1, wherein the processor is further configured for:
responsive to said determination, initiating an insurance workflow process in an external workflow system.

5. The system of claim 1, wherein said determining is associated with at least one of: (i) an insurance policy to be newly issued, (ii) a renewal of an existing insurance policy, and (iii) a periodic evaluation during a term of an existing insurance policy.

6. The system of claim 1, wherein the data indicative of the recommended maintenance schedule is retrieved from a database storing information determined by a manufacturer of the asset.

7. The system of claim 1, wherein the data indicative of the at least one actual maintenance event is received via at least one of: (i) the owner via a web page portal, (ii) the owner via a telephone call, (iii) a service technician who performed a maintenance procedure for the asset, and (iv) a report received from a device associated with the asset.

8. The system of claim 1, wherein the asset is an automobile and the insurance policy is an automobile insurance policy.

9. The system of claim 8, wherein the actual maintenance event is associated with at least one of: (i) an oil change, (ii) an engine tune-up, (iii) brake-pad replacement, (iv) a battery check, (v) an emissions test, (vi) an oil filter change, (vii) a tire rotation, and (viii) a check-up associated with a pre-determined mileage threshold.

10. The system of claim 8, wherein the data indicative of the recommended maintenance schedule is determined based at least in part on: (i) a year of manufacture, (ii) an automobile manufacturer identifier, or (iii) an automobile model.

11. The system of claim 1, wherein the asset comprises at least one of: (i) a boat, (ii) a snowmobile, and (iii) an airplane.

12. The system of claim 1, wherein the asset is associated with a residence and the insurance policy is a homeowner's insurance policy.

13. The system of claim 10, wherein the asset is associated with one or more of: (i) a heating system, (ii) a cooling system, (iii) a water pump, (iv) a washing machine, (v) a dryer, or (vi) a kitchen appliance.

14. The system of claim 13, wherein the data indicative of the recommended maintenance schedule is determined based at least in part on: (i) a year of manufacture, (ii) an asset manufacturer identifier, or (iii) an asset model.

15. The system of claim 1, wherein the asset is a vehicle and the computer memory further stores data indicative of telematics data received from a sensor within the vehicle, the telematics data comprising at least one of geo-position information of the vehicle and vehicle kinematics data, and the benefit is determined based on the data indicative of the telematics data.

16. The system of claim 15, wherein the data indicative of telematics data includes at least one of: (i) times of day associated with driving, (ii) velocities associated with driving, (iii) distances associated with driving, (iv) weather information, (v) traffic information, and (vi) de-acceleration events.

17. The system of claim 1, wherein the processor is further configured for:
outputting to the owner an indication of a suggested maintenance event for the asset.

18. The system of claim 1, wherein the processor is further configured for:
determining a benefit for another insurance policy based at least in part on the result of said comparing, wherein the other insurance policy is associated with at least one of: (i) another asset, (ii) another owner, or (iii) a third party.

19. A computerized method for determining a benefit for an insurance policy associated with an asset owned by an owner, the method comprising:
retrieving, by a computer processor, data indicative of (i) a recommended maintenance schedule for the asset, wherein the recommended maintenance schedule includes a plurality of recommended maintenance events, each recommended maintenance event being associated with servicing the asset in accordance with a recommended maintenance occurrence trigger to keep the asset in good operational condition, and (ii) at least one actual maintenance event that has occurred in connection with the asset;
comparing, by the computer processor, the at least one actual maintenance event with the recommended maintenance schedule, including the recommended maintenance occurrence trigger;
determining, by the computer processor, the benefit for the insurance policy based at least in part on a result of said comparing; and
transmitting, by the insurance processor, an indication of the benefit for the insurance policy.

20. The method of claim 19, wherein the insurance policy comprises either an existing insurance policy or a potential insurance policy to be offered to the owner.

21. The method of claim 19, wherein the benefit for the insurance policy is associated with at least one of: (i) a reduced premium amount, (ii) an increased coverage amount, (iii) a reduced deductible amount, and (iv) additional insurance coverage.

22. The method of claim 19, wherein the data indicative of the recommended maintenance schedule is retrieved from a database storing information determined by a manufacturer of the asset.

23. A non-transitory, computer readable medium having stored therein instructions that, upon execution, cause a computer to perform a method for determining a benefit for an insurance policy associated with an asset owned by an owner, the method comprising:

retrieving data indicative of (i) a recommended maintenance schedule for the asset, wherein the recommended maintenance schedule includes a plurality of recommended maintenance events, each recommended maintenance event being associated with servicing the asset in accordance with a recommended maintenance occurrence trigger to keep the asset in good operational condition, and (ii) at least one actual maintenance event that has occurred in connection with the asset;

comparing the at least one actual maintenance event with the recommended maintenance schedule, including the recommended maintenance occurrence trigger;

determining the benefit for the insurance policy based at least in part on a result of said comparing; and transmitting an indication of the benefit for the insurance policy.

24. The medium of claim 23, wherein the insurance policy comprises either an existing insurance policy or a potential insurance policy to be offered to the owner.

25. The medium of claim 23, wherein the benefit for the insurance policy is associated with at least one of: (i) a reduced premium amount, (ii) an increased coverage amount, (iii) a reduced deductible amount, and (iv) additional insurance coverage.

26. The medium of claim 23, wherein the data indicative of the recommended maintenance schedule is retrieved from a database storing information determined by a manufacturer of the asset.

27. The method of claim 1, wherein the recommended maintenance occurrence trigger comprises a preventive maintenance occurrence trigger and is associated with at least one of: (i) an amount of asset use by which the recommended maintenance event should be performed, (ii) a pre-determined date by which the recommended maintenance event should be performed, and (iii) a pre-determined period of time by which the recommended maintenance event should be performed.

* * * * *